United States Patent
Asano et al.

(10) Patent No.: US 10,847,800 B2
(45) Date of Patent: Nov. 24, 2020

(54) BINDER FOR SECONDARY BATTERIES AND ELECTRODE MIXTURE FOR SECONDARY BATTERIES

(71) Applicant: DAIKIN INDUSTRIES, LTD., Osaka (JP)

(72) Inventors: Kazuya Asano, Osaka (JP); Takashi Iguchi, Osaka (JP); Manabu Fujisawa, Osaka (JP); Chihiro Shinoda, Osaka (JP); Tomoyuki Goto, Osaka (JP); Kazuki Hosoda, Osaka (JP); Takahiro Kitahara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/301,597

(22) PCT Filed: Sep. 27, 2017

(86) PCT No.: PCT/JP2017/034954
§ 371 (c)(1),
(2) Date: Nov. 14, 2018

(87) PCT Pub. No.: WO2018/066430
PCT Pub. Date: Apr. 12, 2018

(65) Prior Publication Data
US 2019/0296359 A1    Sep. 26, 2019

(30) Foreign Application Priority Data

Oct. 7, 2016 (JP) .................................. 2016-199124
Feb. 13, 2017 (JP) .................................. 2017-024408
May 26, 2017 (JP) .................................. 2017-104880

(51) Int. Cl.
*H01M 4/62* (2006.01)
*C08F 214/22* (2006.01)
*H01M 4/139* (2010.01)
*H01M 4/04* (2006.01)

(52) U.S. Cl.
CPC .......... *H01M 4/623* (2013.01); *C08F 214/22* (2013.01); *H01M 4/04* (2013.01); *H01M 4/139* (2013.01); *H01M 4/62* (2013.01)

(58) Field of Classification Search
None
See application file for complete search history.

(56) References Cited

U.S. PATENT DOCUMENTS

| | | | |
|---|---|---|---|
| 3,318,850 A * | 5/1967 | Stilmar | C08F 214/225 526/255 |
| 5,246,796 A | 9/1993 | Nagamine et al. | |
| 5,415,958 A | 5/1995 | Takahashi et al. | |
| 6,265,107 B1 | 7/2001 | Shimizu et al. | |
| 2009/0239147 A1* | 9/2009 | Itou | C08L 27/16 429/217 |
| 2010/0133482 A1 | 6/2010 | Abusleme et al. | |
| 2012/0301728 A1* | 11/2012 | Saito | C08G 18/6279 428/421 |
| 2013/0052530 A1* | 2/2013 | Kitaguchi | H01M 4/623 429/211 |
| 2013/0264522 A1* | 10/2013 | Stanga | C08F 214/22 252/500 |
| 2015/0137029 A1 | 5/2015 | Ichisaka et al. | |
| 2015/0188108 A1* | 7/2015 | Miyazawa | H01M 2/1653 429/145 |
| 2015/0213968 A1* | 7/2015 | Kitaguchi | H01M 4/13 429/217 |
| 2016/0204490 A1* | 7/2016 | Scott | H01M 2/40 429/405 |

FOREIGN PATENT DOCUMENTS

| | | |
|---|---|---|
| JP | 4-249859 A | 9/1992 |
| JP | 7-201316 A | 8/1995 |
| JP | 10-233217 A | 9/1998 |
| JP | 2001-19896 A | 1/2001 |
| JP | 2010-525124 A | 7/2010 |
| KR | 10-2015-0022837 A | 3/2015 |
| WO | 2016/076371 A1 | 5/2016 |

OTHER PUBLICATIONS

International Preliminary Report on Patentability with the translation of Written Opinion dated Apr. 9, 2019 issued by the International Bureau in PCT/JP2017/034954.
International Search Report for PCT/JP2017/034954, dated Dec. 12, 2017.
Communication dated Dec. 2, 2019, from the European Patent Office in counterpart European Application No. 17858268.0.

* cited by examiner

*Primary Examiner* — Katie L. Hammer
(74) *Attorney, Agent, or Firm* — Sughrue Mion, PLLC

(57) ABSTRACT

A binder and an electrode mixture for a secondary battery. The binder contains a fluorine-containing polymer containing a polymerized unit based on vinylidene fluoride, a polymerized unit based on tetrafluoroethylene, and a polymerized unit based on a monomer (2-2) represented by the following formula (2-2):

$$R^5R^6C=CR^7R^8CO_2Y^1 \qquad (2\text{-}2)$$

wherein $R^5$, $R^6$, and $R^7$ are each independently a hydrogen atom or a C1-C8 hydrocarbon group; $R^8$ is a C1-C8 hydrocarbon group; and $Y^1$ is an inorganic cation and/or an organic cation.

10 Claims, No Drawings

BINDER FOR SECONDARY BATTERIES AND ELECTRODE MIXTURE FOR SECONDARY BATTERIES

CROSS REFERENCE TO RELATED APPLICATIONS

This Application is a National Stage of International Application No. PCT/JP2017/034954 filed Sep. 27, 2017, claiming priority based on Japanese Patent Application No. 2016-199124 filed Oct. 7, 2016, Japanese Patent Application No. 2017-024408 filed Feb. 13, 2017 and Japanese Patent Application No. 2017-104880 filed May 26, 2017.

TECHNICAL FIELD

The invention relates to binders for secondary batteries and electrode mixtures for secondary batteries.

BACKGROUND ART

Secondary batteries such as lithium ion secondary batteries have characteristics such as a high voltage, a high energy density, less self-discharge, a smaller memory effect, and a significantly light weight. Thus, secondary batteries are used for compact and easy-to-carry electrical and electronic equipment such as laptop computers, mobile phones, smart phones, tablet PCs, and ultrabooks. In addition, such secondary batteries are being put into practical use as electric power supplies for a variety of applications from vehicle power supplies for driving used in automobiles to stationary large power supplies. Secondary batteries are required to have a much higher energy density and much better battery characteristics. To ensure the safety also becomes a technical problem.

In order to improve the energy density of secondary batteries, the technique of producing electrodes is an important point. In production of negative electrodes of lithium ion secondary batteries from a carbonaceous material, such as coke or carbon, serving as a negative electrode active material, for example, a carbonaceous material is usually powdered and dispersed in a solvent together with a binder to prepare a negative electrode mixture. This negative electrode mixture is then applied to a negative electrode current collector and, after drying and removal of the solvent, rolled to give an electrode. Carbonaceous materials merely occluding and releasing lithium ions are also referred to as active materials herein. Similarly, in production of positive electrodes, for example, a lithium-containing oxide serving as a positive electrode active material is usually powdered and dispersed in a solvent together with a conductive agent and a binder to prepare a positive electrode mixture. This positive electrode mixture is then applied to a positive electrode current collector and, after drying and removal of the solvent, rolled to give an electrode. In lithium ion secondary batteries used for electric vehicles, for example, the mainstream of the density of a positive electrode mixture film is typically 3.4 to 3.6 g/cc. Still, in order to densify the energy, further densification of a positive electrode mixture film is required. A typical binder used in conventional lithium ion secondary batteries is polyvinylidene fluoride.

For example, Patent Literature 1 discloses the following technique. Specifically, a lithium-containing oxide (e.g., $LiCoO_2$) serving as a positive electrode active material, graphite serving as a conductive agent, and polyvinylidene fluoride are mixed to provide a positive electrode mixture. This positive electrode mixture is dispersed in N-methylpyrrolidone to give slurry. The slurry is then applied to aluminum foil serving as a positive electrode current collector. Separately, a carbonaceous material serving as a negative electrode active material and polyvinylidene fluoride are mixed to provide a negative electrode mixture. This negative electrode mixture is dispersed in N-methylpyrrolidone to give slurry. The slurry is applied to copper foil serving as a negative electrode current collector. The workpieces are dried and compression-molded into an electrode sheet using a roller pressing machine.

Polyvinylidene fluoride resin, however, has poor adhesion strength to base materials such as metals, and the adhesion strength thereof is thus desired to be improved. Further, in order to improve the density of a positive electrode mixture film after a positive electrode mixture is applied to a positive electrode current collector and the solvent is dried and removed, rolling is performed in usual cases. Still, electrode sheets containing a polyvinylidene fluoride binder have poor flexibility, and such positive electrode mixture films are difficult to further density. In addition, since such electrode sheets containing a polyvinylidene fluoride binder have poor flexibility, they easily suffer from cracking or removal of the electrode mixture therefrom during a step of folding the electrode sheets 180° in production of square cells or during a step of rolling the electrode sheets into a small dimension in production of cylindrical cells. This tends to cause a poor yield. When an active material rich in Ni is used to prepare slurry in NMP together with polyvinylidene fluoride and a conductive agent, such an active material causes alkaline conditions, so that the slurry may have high viscosity and may be gelatinized, and thus is difficult to stably apply to a current collector in many cases. The gelling of slurry means the state of having an increased viscosity and thus having reduced fluidity and uniformity. If gelling extremely proceeds, the slurry cannot be applied to a current collector.

Patent Literature 2 discloses a paint composition exhibiting good adhesiveness to a substrate of, e.g., a metal. This paint composition contains a polar vinylidene fluoride copolymer as a binder, and the copolymer is obtainable by copolymerizing, in an aqueous medium, a monomer mixture containing: 100 parts by weight of a vinylidene fluoride monomer including vinylidene fluoride alone or a mixture of vinylidene fluoride and a monomer copolymerizable with vinylidene fluoride, each containing 80 wt % or more of vinylidene fluoride; and (a) 0.1 to 3 parts by weight of a monoester of an unsaturated dibasic acid copolymerizable with vinylidene fluoride or (b) 0.1 to 5 parts by weight of vinylene carbonate.

Patent Literature 3 discloses a binder to be used for a non-aqueous electrolyte solution secondary battery including a positive electrode including a positive electrode current collector and a positive electrode mixture that is supported by the current collector and contains a positive electrode active material, a conductive agent, and a binder, and/or a negative electrode including a negative electrode current collector and a negative electrode mixture that is supported by the current collector and contains a negative electrode active material and a binder, and a non-aqueous electrolyte solution, wherein the binder contains a copolymer of 50 to 80 mol % of vinylidene fluoride and 20 to 50 mol % of tetrafluoroethylene.

Patent Literature 4 discloses a non-aqueous electrolyte solution secondary battery including a negative electrode that includes a negative electrode current collector and a negative electrode mixture that is supported by the current collector and contains a negative electrode active material and a binder, a positive electrode that includes a positive electrode current collector and a positive electrode mixture that is supported by the current collector and contains a positive electrode active material, a conductive agent, and a binder, and a non-aqueous electrolyte solution, wherein at least part of the binders contained in the negative electrode mixture and the positive electrode mixture is polyvinylidene fluoride containing a hydrophilic polar group.

Patent Literature 5 discloses an electrode-forming composition containing a linear semi-crystalline copolymer (polymer(A)) containing recurring units derived from a vinylidene fluoride (VDF) monomer and a specific hydrophilic (meth)acrylic monomer (MA), a powdery electrode material, and optionally an electroconductivity-imparting additive and/or a viscosity modifying agent, wherein the polymer (A) contains from 0.05 to 10 mol % of recurring units derived from the hydrophilic (meth)acrylic monomer (MA) and is characterized by a fraction of randomly distributed units (MA) of at least 40%.

CITATION LIST

Patent Literature

Patent Literature 1: JP H04-249859 A
Patent Literature 2: JP 2001-19896 A
Patent Literature 3: JP H10-233217 A
Patent Literature 4: JP H07-201316 A
Patent Literature 5: JP 2010-525124 T

SUMMARY OF INVENTION

Technical Problem

As described above, a variety of binders for electrodes are studied as the demand for secondary batteries increases. The recently increasing demand for small and light or thin and light electronic devices necessitates higher performance of batteries. For example, batteries with higher capacity or higher voltage are studied, and in order to achieve such batteries, binders are required which have both much better adhesiveness to a current collector (collector substrate) and flexibility.

The invention is made in view of the above current state of the art, and aims to provide a binder for a secondary battery excellent in both the adhesiveness to a current collector and the flexibility, and an electrode mixture for a secondary battery.

Solution to Problem

The invention relates to a binder for a secondary battery, including a fluorine-containing polymer containing: a polymerized unit based on vinylidene fluoride; a polymerized unit based on tetrafluoroethylene; and a polymerized unit based on a monomer (2-2) represented by the following formula (2-2).

[Chem. 1]

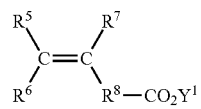

(2-2)

In the formula, $R^5$, $R^6$, and $R^7$ are each independently a hydrogen atom or a C1-C8 hydrocarbon group; $R^8$ is a C1-C8 hydrocarbon group; and $Y^1$ is an inorganic cation and/or an organic cation.

$Y^1$ is preferably at least one cation selected from the group consisting of H, Li, Na, K, Mg, Ca, Al, and $NH_4$.

The fluorine-containing polymer preferably contains the polymerized unit based on vinylidene fluoride in an amount of 50 to 95 mol %, the polymerized unit based on tetrafluoroethylene in an amount of 4.8 to 49.95 mol %, and the polymerized unit based on the monomer (2-2) in an amount of 0.05 to 2.0 mol %, of all the polymerized units.

The fluorine-containing polymer preferably has a weight average molecular weight of 50000 to 2000000.

The fluorine-containing polymer preferably has a storage elastic modulus of 1000 MPa or lower, more preferably 800 MPa or lower, at 25° C.

The invention also relates to an electrode mixture for a secondary battery, comprising a mixture containing at least: the binder for a secondary battery; a powdery electrode material for a battery; and water or a nonaqueous solvent.

The invention also relates to an electrode for a secondary battery, containing the binder for a secondary battery.

The invention also relates to a secondary battery including the electrode for a secondary battery.

Advantageous Effects of Invention

The binder of the invention has the above structure, and thus is excellent in both the adhesiveness to a current collector and the flexibility.

The electrode mixture of the invention has the above structure, and thus can form an electrode material layer excellent in both the adhesiveness to a current collector and the flexibility.

DESCRIPTION OF EMBODIMENTS

The invention will be specifically described hereinbelow.

The binder of the invention contains a fluorine-containing polymer. The fluorine-containing polymer contains a polymerized unit based on vinylidene fluoride, a polymerized unit based on tetrafluoroethylene, and a polymerized unit based on a monomer (2-2) represented by the formula (2-2) mentioned later.

Since the binder of the invention contains the fluorine-containing polymer, it has excellent adhesiveness to a current collector and flexibility. Binders themselves hardly contribute to the electrochemical performance of electrodes, and the amount thereof is therefore preferably as small as possible in order to densify the electrodes and to lower the internal resistance of the electrodes. Since the binder of the invention has excellent adhesiveness to a current collector, the amount thereof can be reduced. This can improve the electrode density and reduce the resistance of the electrodes, improving the battery performance. Additionally, as the amount of the binder is reduced, the production cost can also be reduced. Since an electrode sheet containing the binder of the invention has excellent flexibility, it can easily be densified during rolling of a positive electrode mixture film. Lithium ion secondary batteries, to which the electrode sheet is typically applied, are in the form of cylinder, square, or laminate. The electrode sheet is rolled or pressed before introduced into a battery. In these steps, the electrode sheet may easily crack, cause falling of a powdery electrode material, or separate from a current collector. In contrast, the binder of the invention is excellent in the adhesiveness to a current collector and the flexibility, and thus the electrode does not crack, does not cause falling of the powdery electrode material, and does not separate from the current collector even when the electrode material is applied thickly and then rolled or pressed so as to achieve densification. Further, in order to increase the capacity of lithium ion secondary batteries, the amount of nickel in an active material is increased. This unfortunately causes alkaline conditions in formation of an electrode mixture, resulting in gelling of the electrode mixture. In contrast, the binder of the invention contains a fluorine-containing polymer, and thus the electrode mixture produced is not gelatinized and maintains the fluidity even after long-term storage. Further, the presence of the fluorine-containing polymer allows a secondary battery containing the binder of the invention to have excellent rate characteristics.

The fluorine-containing polymer contains a polymerized unit based on the monomer (2-2). The monomer (2-2) contains a specific functional group, which can improve the adhesiveness between the binder and a current collector and, surprisingly, can also improve the flexibility.

The monomer (2-2) is a monomer represented by the following formula (2-2). One monomer (2-2) or two or more monomers (2-2) may be used.

[Chem. 2]

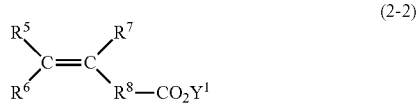

(2-2)

In the formula, $R^5$, $R^6$, and $R^7$ are each independently a hydrogen atom or a C1-C8 hydrocarbon group; $R^8$ is a C1-C8 hydrocarbon group; and $Y^1$ is an inorganic cation and/or an organic cation.

In the formula (2-2), $Y^1$ is an inorganic cation and/or an organic cation. Examples of the inorganic cation include cations such as H, Li, Na, K, Mg, Ca, Al, and Fe. Examples of the organic cation include cations such as $NH_4$, $NH_3R^x$, $NH_2R^x{}_2$, $NHR^x{}_3$, and $NR^x{}_4$ (wherein $R^x$s are each independently a C1-C4 alkyl group). $Y^1$ is preferably H, Li, Na, K, Mg, Ca, Al, or $NH_4$, more preferably H, Li, Na, K, Mg, Al, or $NH_4$, still more preferably H, Li, Al, or $NH_4$, particularly preferably H. These specific examples of the inorganic and organic cations are mentioned without the sign and valence for convenience.

In the formula (2-2), $R^5$, $R^6$, and $R^7$ are each independently a hydrogen atom or a C1-C8 hydrocarbon group. The hydrocarbon group is a monovalent hydrocarbon group. The hydrocarbon group preferably has a carbon number of 4 or smaller. Examples of the hydrocarbon group include alkyl groups, alkenyl groups, and alkynyl groups of the above carbon number, and preferred examples thereof include a methyl group and an ethyl group. $R^5$ and $R^6$ are each independently preferably a hydrogen atom, a methyl group, or an ethyl group, and $R^7$ is preferably a hydrogen atom or a methyl group.

In the formula (2-2), $R^8$ is a C1-C8 hydrocarbon group. The hydrocarbon group is a divalent hydrocarbon group. The hydrocarbon group preferably has a carbon number of 4 or smaller. Examples of the hydrocarbon group include alkylene groups and alkenylene groups of the above carbon number, and preferred examples thereof include a methylene group, an ethylene group, an ethylidene group, a propylidene group, and an isopropylidene group. A methylene group is more preferred.

Particularly preferred examples of the monomer (2-2) include vinylacetic acid (3-butenoic acid) and salts thereof, 3-pentenoic acid and salts thereof, 4-pentenoic acid and salts thereof, 3-hexenoic acid and salts thereof, 4-hexenoic acid and salts thereof, and 5-hexenoic acid and salts thereof.

The fluorine-containing polymer preferably contains the polymerized unit based on the monomer (2-2) in an amount of 0.05 to 2.0 mol % of all the polymerized units. This polymerized unit in an amount within the above range can improve the adhesiveness between the binder and a current collector without impairing the characteristics owing to vinylidene fluoride and tetrafluoroethylene. The amount of the polymerized unit is more preferably 0.10 mol % or more, still more preferably 0.30 mol % or more, further more preferably 0.40 mol % or more, while more preferably 1.5 mol % or less.

The fluorine-containing polymer contains a polymerized unit based on vinylidene fluoride. This allows the binder to have excellent solvent solubility, oxidation resistance, and electrolytic solution erosion resistance.

The fluorine-containing polymer contains a polymerized unit based on tetrafluoroethylene. This allows the binder to have excellent flexibility. This also improves the chemical resistance (especially alkali resistance).

The fluorine-containing polymer preferably contains the polymerized unit based on vinylidene fluoride in an amount of 50 to 95 mol % of all the polymerized units and the polymerized unit based on tetrafluoroethylene in an amount of 4.8 to 49.95 mol % of all the polymerized units. This allows the binder to have improved flexibility and chemical resistance without impairing the characteristics owing to the other polymerized units. The amount of the polymerized unit based on vinylidene fluoride is more preferably 60 to 90 mol %, and the amount of the polymerized unit based on tetrafluoroethylene is more preferably 9.8 to 39.95 mol %.

The upper limit of the amount of the polymerized unit based on vinylidene fluoride may be 94 mol % or may be 89 mol %.

The upper limit of the amount of the polymerized unit based on tetrafluoroethylene may be 49.90 mol %, 49.70 mol %, 49.60 mol %, 49 mol %, 39.90 mol %, 39.70 mol %, 39.60 mol %, or 39 mol %.

As long as the fluorine-containing polymer contains the polymerized unit based on vinylidene fluoride, the polymerized unit based on tetrafluoroethylene, and the polymerized unit based on the monomer (2-2), it may further contain a polymerized unit based on a different monomer copolymerizable with these monomers.

Examples of the different monomer to be used include vinyl fluoride, trifluoroethylene, chlorotrifluoroethylene, fluoroalkyl vinyl ether, hexafluoropropylene, 2,3,3,3-tetrafluoropropene, and propylene. In terms of flexibility and chemical resistance, hexafluoropropylene and 2,3,3,3-tetrafluoropropene are particularly preferred.

In the case of using any of these monomers, the amount of the polymerized unit based on the monomer(s) is preferably 0.1 to 50 mol % of all the polymerized units.

In order to prepare uniform electrode slurry, the fluorine-containing polymer preferably has a weight average molecular weight (polystyrene equivalent) of 50000 to 2000000. The weight average molecular weight is more preferably 80000 to 1700000, still more preferably 100000 to 1500000.

In order to improve the battery characteristics, the weight average molecular weight is more preferably 80000 to 1950000, still more preferably 100000 to 1900000, further more preferably 200000 to 1900000.

The weight average molecular weight can be determined by gel permeation chromatography (GPC) using N,N-dimethylformamide as a solvent at 50° C.

In order to improve the battery characteristics, the fluorine-containing polymer preferably has a number average molecular weight (polystyrene equivalent) of 16000 to 1300000. The number average molecular weight is more preferably 20000 to 1200000.

The number average molecular weight can be determined by gel permeation chromatography (GPC) using N,N-dimethylformamide as a solvent at 50° C.

The fluorine-containing polymer preferably has an elongation at break of 100% or higher. The polymer having an elongation at break of 100% or higher can further improve the flexibility of the binder. The elongation at break is more preferably 200% or higher, still more preferably 300% or higher.

The elongation at break can be determined by the following method. Specifically, a binder (fluorine-containing polymer) is weighed and dissolved in N-methyl-2-pyrrolidone (NMP) such that the concentration is 5 mass %, whereby a binder solution is prepared. The binder solution is cast on a glass plate and dried at 100° C. for two hours, so that a film having a thickness of about 30 μm is obtained. The film is then punched into a dumbbell shape, and the elongation at break thereof is measured using an autograph at 25° C.

The fluorine-containing polymer preferably has a storage elastic modulus of 1000 MPa or lower at 25° C. The fluorine-containing polymer having a storage elastic modulus of 1000 MPa or lower at 25° C. can furthermore improve the flexibility of the binder. The storage elastic modulus is more preferably 800 MPa or lower, still more preferably 600 MPa or lower. The storage elastic modulus is also preferably 100 MPa or higher, more preferably 200 MPa or higher, still more preferably 250 MPa or higher.

The fluorine-containing polymer preferably has a storage elastic modulus of 200 MPa or lower at 100° C. The fluorine-containing polymer having a storage elastic modulus of 200 MPa or lower at 100° C. can furthermore improve the flexibility of the binder. The storage elastic modulus is more preferably 160 MPa or lower, still more preferably 140 MPa or lower, further more preferably 110 MPa or lower. The storage elastic modulus is also preferably 1 MPa or higher, more preferably 5 MPa or higher, still more preferably 10 MPa or higher.

The storage elastic modulus is a value at 25° C. and at 100° C. measured for a sample having a size of 30 mm in length, 5 mm in width, and 40 μm in thickness using a dynamic viscoelasticity analyzer DVA220 (IT Keisoku Seigyo K.K.) by dynamic mechanical analysis in a tensile mode, at a grip width of 20 mm, a measurement temperature of −30° C. to 160° C., a temperature-increasing rate of 2° C./min, and a frequency of 1 Hz.

The measurement sample can be prepared by, for example, weighing a binder (fluorine-containing polymer) and dissolving it in N-methyl-2-pyrrolidone (NMP) such that the concentration is 8 mass %, thereby providing a binder solution; casting the solution on a glass plate and drying it at 100° C. for 12 hours, then at 100° C. for 12 hours in vacuo; and cutting the resulting film having a thickness of 40 μm into a size of 30 mm in length and 5 mm in width.

The fluorine-containing polymer in the invention, if having a low storage elastic modulus as mentioned above, can easily increase the density during rolling the positive electrode mixture film, and is expected to increase the density of the positive electrode mixture film to 3.6 g/cc or higher. Further, in this case, the electrode formed from the fluorine-containing polymer in the invention does not suffer from cracking even when the electrode is thickly applied and densified and the resulting film is rolled.

Copolymerization of vinylidene fluoride, tetrafluoroethylene, the monomer (2-2), and optionally a different monomer copolymerizable with these monomers may be performed by any technique such as suspension polymerization, emulsion polymerization, or solution polymerization. In consideration of easy aftertreatment, aqueous suspension polymerization or emulsion polymerization is preferred.

In the above copolymerization, a polymerization initiator, a surfactant, a chain-transfer agent, and a solvent may be used, each of which may be any conventionally known one. The polymerization initiator may be an oil-soluble radical polymerization initiator or a water-soluble radical polymerization initiator.

The oil-soluble radical polymerization initiator may be a known oil-soluble peroxide, and typical examples thereof include dialkyl peroxycarbonates such as diisopropyl peroxydicarbonate, di-n-propyl peroxydicarbonate, and di-sec-butyl peroxydicarbonate; peroxyesters such as t-butyl peroxyisobutyrate and t-butyl peroxypivalate; dialkyl peroxides such as di-t-butyl peroxide; and di(perfluoro (or fluorochloro) acyl]peroxides such as di(ω-hydro-dodecafluoroheptanoyl)peroxide, di(ω-hydro-tetradecafluoroheptanoyl) peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl) peroxide, and di(undecachlorodotriacontafluorodocosanoyl) peroxide.

The water-soluble radical polymerization initiator may be a known water-soluble peroxide, and examples thereof include ammonium salts, potassium salts, sodium salts, t-butyl permaleates, and t-butyl hydroperoxides of persulfuric acid, perboric acid, perchloric acid, perphosphoric acid, and percarbonic acid. Any reducing agent such as a sulfite or a sulfurous acid salt may be used in combination with a peroxide, and the amount thereof may be 0.1 to 20 times the amount of the peroxide.

The surfactant may be a known surfactant, and examples thereof include nonionic surfactants, anionic surfactants, and cationic surfactants. Preferred are fluorine-containing anionic fluorosurfactants, and more preferred are C4-C20 linear or branched fluorine-containing anionic surfactants which may optionally contain an ether bond (i.e., an oxygen atom may be present between carbon atoms). The amount thereof (relative to the water as a polymerization medium) is preferably 50 to 5000 ppm.

Examples of the chain-transfer agent include hydrocarbons such as ethane, isopentane, n-hexane, and cyclohexane; aromatic substances such as toluene and xylene; ketones such as acetone; acetates such as ethyl acetate and butyl acetate; alcohols such as methanol and ethanol; mercaptans such as methyl mercaptan; and halogenated hydrocarbons such as carbon tetrachloride, chloroform, methylene chloride, and methyl chloride. The amount thereof may vary in accordance with the chain transfer constant of the compound used, and is typically 0.01 to 20 mass % relative to the polymerization solvent.

Examples of the solvent include water and solvent mixtures of water and an alcohol.

In the suspension polymerization, a fluorosolvent may be used in addition to water. Examples of the fluorosolvent include hydrochlorofluoroalkanes such as $CH_3CClF_2$, $CH_3CCl_2F$, $CF_3CF_2CCl_2H$, and $CF_2ClCF_2CFHCl$; chlorofluoroalkanes such as $CF_2ClCFClCF_2CF_3$ and $CF_3CFClCFClCF_3$; perfluoroalkanes such as perfluorocyclobutane, $CF_3CF_2CF_2CF_3$, $CF_3CF_2CF_2CF_2CF_3$, and $CF_3CF_2CF_2CF_2CF_2CF_3$; hydrofluorocarbons such as $CF_2HCF_2CF_2CF_2H$, $CF_3CFHCF_2CF_2CF_3$, $CF_3CF_2CF_2CF_2CF_2H$—$CF_3CF_2CFHCF_2CF_3$, $CF_3CFHCFHCF_2CF_3$, $CF_2HCF_2CF_2CF_2CF_2H$, $CF_2HCFHCF_2CF_2CF_3$, $CF_3CF_2CF_2CF_2CF_2CF_2H$, $CF_3CH(CF_3)CF_3CF_2CF_3$, $CF_3CF(CF_3)CFHCF_2CF_3$. $CF_3CF(CF_3)CFHCFHCF_3$, $CF_3CH(CF_3)CFHCF_2CF_3$, $CF_2HCF_2CF_2CF_2CF_2CF_2H$, $CF_3CF_2CF_2CF_2CH_2CH_3$, and $CF_3CH_2CF_2CH_3$; (perfluoroalkyl)alkyl ethers such as $F(CF_2)_4OCH_3$, $F(CF_2)_4OC_2H_5$, $(CF_3)_2CFOCH_3$, and $F(CF_2)_3OCH_3$; and hydrofluoroalkyl ethers such as $CF_3CH_2OCF_2CHF_2$, $CHF_2CF_2CH_2OCF_2CHF_2$, and $CF_3CF_2CH_2OCF_2CHF_2$. Preferred are perfluoroalkanes. In terms of suspension performance and economic efficiency, the amount of the fluorosolvent is preferably 10 to 100 mass % relative to the aqueous medium.

The polymerization temperature may be, but is not limited to, 0° C. to 100° C. The polymerization pressure is appropriately set in accordance with other polymerization conditions such as the type, amount, and vapor pressure of a solvent used, and the polymerization temperature. It may typically be 0 to 9.8 MPaG.

In the case of suspension polymerization using water as a dispersion medium, a suspension agent such as methyl cellulose, methoxylated methyl cellulose, propoxylated methyl cellulose, hydroxyethyl cellulose, hydroxypropyl cellulose, polyvinyl alcohol, polyethylene oxide, or gelatin may be used in an amount of 0.005 to 1.0 mass %, preferably 0.01 to 0.4 mass %, relative to the water.

Examples of the polymerization initiator to be used in this case include diisopropyl peroxydicarbonate, di-normal-propyl peroxydicarbonate, di-normal-heptafluoropropyl peroxydicarbonate, isobutyryl peroxide, di(chlorofluoroacyl) peroxide, and di(perfluoroacyl)peroxide. The amount thereof is preferably 0.1 to 5 mass % relative to the sum of the amounts of the monomers (the sum of the amounts of vinylidene fluoride, tetrafluoroethylene, the monomer (2-2), and optionally a different monomer copolymerizable with these monomers).

Further, the polymerization degree of the polymer to be obtained can be controlled by adding a chain-transfer agent such as ethyl acetate, methyl acetate, acetone, ethanol, n-propanol, acetaldehyde, propylaldehyde, ethyl propionate, or carbon tetrachloride. The amount thereof is typically 0.1 to 5 mass %, preferably 0.5 to 3 mass %, relative to the sum of the amounts of the monomers.

The sum of the amounts of the monomers expressed by the ratio by weight of (sum of amounts of monomers): (water) is 1:1 to 1:10, preferably 1:2 to 1:5. The polymerization is performed at a temperature of 10° C. to 50° C. for 10 to 100 hours.

The aforementioned suspension polymerization can easily copolymerize vinylidene fluoride, tetrafluoroethylene, the monomer (2-2), and optionally a different monomer.

The emulsion polymerization is performed in the presence of an aqueous medium. The aqueous medium is preferably water. The water used in the polymerization is preferably deionized water, and the electrical conductivity thereof is 10 μS/cm or lower and is preferably as low as possible. If there are many ions, the reaction rate may be unstable. Also, the fluorosolvent preferably contains minimum amounts of components such as compounds containing an acid and a chlorine group introduced during production, i.e., has a purity as high as possible. Such compounds containing an acid and chlorine may chain transfer. Thus, to minimize the amounts of such compounds is preferred so as to stabilize the polymerization rate and the molecular weight. In addition, other materials to be used in the polymerization (e.g., monomers such as vinylidene fluoride and tetrafluoroethylene, initiator, chain-transfer agent) are also preferably those having high purity containing small amounts of chain-transfer components. In order to stabilize the reaction rate and to control the molecular weight, a preparatory stage for the reaction is preferably performed as follows. Specifically, a container is charged with water and subjected to an air-tight test under stirring, and then the pressure inside the container is reduced, slightly increased with nitrogen, and reduced repeatedly. The oxygen concentration in the container is then checked whether it is reduced to as low as 1000 ppm or lower, and again the pressure is reduced and materials such as the monomers are fed, so that the reaction is initiated.

In the emulsion polymerization, the polymerization temperature may be, but is not limited to, 0° C. to 150° C. The polymerization pressure is appropriately set in accordance with other polymerization conditions such as the polymerization temperature, and may typically be 0 to 9.8 MPaG.

In the emulsion polymerization, one or more surfactants may be used. The surfactant may be any known emulsifier, and examples thereof include the following surfactant groups [A] to [G].

(Surfactant group [A])

Fluorine-containing anionic alkyl surfactants such as $CF_3(CF_2)_4COONH_4$, $CF_3(CF_2)_3COONH_4$, $CF_3(CF_2)_2COONH_4$, $CF_3(CF_2)_3SO_3Na$, and $CF_3(CF_2)_3SO_2NH_2$ (Surfactant Group [B])

Fluorine-containing anionic alkyl ether surfactants represented by the formula: $CF_3O-CF(CF_3)CF_2O-CX^a(CF_3)-Y^a$ (wherein $X^a$ is H or F; and $Y^a$ is $-COOM^1$, $-SO_3M^2$, $-SO_2NM^3M^4$, or $-PO_3M^5M^6$, where $M^1$, $M^2$, $M^3$, $M^4$, $M^5$, and $M^6$ are the same as or different from each other, and are each H, $NH_4$, or a monovalent cation); those represented by the formula: $CF_3O-CF_2CF_2CF_2O-CFX^aCF_2-Y^a$ (wherein $X^a$ is H or F; and $Y^a$ is defined in the same manner as above); and those represented by the formula: $CF_3CF_2O-CF_2CF_2O-CFX^a-Y^a$ (wherein $X^a$ is H or F; and $Y^a$ is defined in the same manner as above)

(Surfactant Group [C])

Fluorine-containing allyl ethers such as $CH_2=CFCF_2-O-(CF(CF_3) CF_2O)-CF(CF_3)-COONH_4$ (Surfactant Group [D])

Non-fluorinated surfactants, including alkanesulfonic acids such as linear 1-octanesulfonic acid, linear 2-octanesulfonic acid, linear 1,2-octanedisulfonic acid, linear 1-decanesulfonic acid, linear 2-decanesulfonic acid, linear 1,2-decanedisulfonic acid, linear 1,2-dodecanedisulfonic acid, linear 1-dodecanesulfonic acid, linear 2-dodecanesulfonic acid, and linear 1,2-dodecanedisulfonic acid, and salts thereof; alkyl sulfates such as 1-octylsulfate, 2-octylsulfate, 1,2-octyldisulfate, 1-decylsulfate, 2-decylsulfate, 1,2-decyldisulfate, 1-dodecylsulfate, 2-dodecylsulfate, and 1,2-dodecyl disulfate, and salts thereof; polyvinylphosphonic acid and salts thereof; polyacrylic acid and salts thereof; and polyvinylsulfonic acid and salts thereof (Surfactant Group [E])

Non-fluorine ether surfactants such as polyethylene glycol acrylate, polyethylene glycol, polyethylene glycol phenol oxide, polypropylene glycol acrylate, and polypropylene glycol (Surfactant Group [F])

Mixtures of at least one surfactant selected from the group consisting of non-fluorine surfactants (e.g., at least one selected from the surfactant group [D]) and fluorine-containing surfactants having a molecular weight of less than 400, and a functional fluoropolyether (a compound containing a fluoropolyoxyalkylene chain (e.g., a chain containing at least one repeating unit represented by the formula: —(CF$_2$)$_j$—CFZ$^e$O— (wherein Z$^e$ is F or a C1-C5 (per)fluoro(oxy)alkyl group; and j is an integer of 0 to 3)) and a functional group (e.g., at least one selected from the group consisting of a carboxylic acid group, a phosphonic acid group, a sulfonic acid group, and acid-salt-type groups thereof))

(Surfactant Group [G])

Inactivated non-fluorine surfactants (e.g., products obtained by reacting a hydrocarbon-containing surfactant such as sodium dodecylsulfate, linear sodium alkylpolyether sulfonate, or a siloxane surfactant with hydrogen peroxide or a polymerization initiator to be mentioned later)

The amount of the surfactant is preferably 1 to 50000 ppm of the aqueous medium.

The polymerization initiator for the emulsion polymerization may be an oil-soluble radical polymerization initiator or a water-soluble radical polymerization initiator, and is preferably a water-soluble radical polymerization initiator.

The oil-soluble radical polymerization initiator may be a known oil-soluble peroxide, and typical examples thereof include dialkyl peroxycarbonates such as diisopropyl peroxydicarbonate, di-n-propyl peroxydicarbonate, and di-sec-butyl peroxydicarbonate; peroxyesters such as t-butyl peroxyisobutyrate and t-butyl peroxypivalate; dialkyl peroxides such as di-t-butyl peroxide; and di(perfluoro (or fluorochloro) acyl]peroxides such as di(ω-hydro-dodecafluoroheptanoyl)peroxide, di(ω-hydro-tetradecafluoroheptanoyl) peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl) peroxide, and di(undecachlorodotriacontafluorodocosanoyl) peroxide.

The water-soluble radical polymerization initiator may be a known water-soluble peroxide, and examples thereof include ammonium salts, potassium salts, sodium salts, t-butyl permaleates, and t-butyl hydroperoxides of persulfuric acid, perboric acid, perchloric acid, perphosphoric acid, and percarbonic acid. Any reducing agent such as a sulfite or a sulfurous acid salt may be used in combination with a peroxide, and the amount thereof may be 0.1 to 20 times the amount of the peroxide.

The polymerization initiator for the emulsion polymerization is more preferably a persulfate. The amount thereof is 0.001 to 20 mass % relative to the aqueous medium.

In the emulsion polymerization, a chain-transfer agent may be used. Examples of the chain-transfer agent include hydrocarbons such as ethane, isopentane, n-hexane, and cyclohexane; aromatic substances such as toluene and xylene; ketones such as acetone; acetates such as ethyl acetate and butyl acetate; alcohols such as methanol and ethanol; mercaptans such as methyl mercaptan; and halogenated hydrocarbons such as carbon tetrachloride, chloroform, methylene chloride, and methyl chloride. The amount thereof may vary in accordance with the chain transfer constant of the compound used, and is 0.001 to 20 mass % relative to the aqueous medium.

In the case of powdering the latex obtained by the emulsion polymerization, this powdering may be achieved by any method, including conventionally known methods. Examples thereof include coagulation by adding acid, coagulation by adding inorganic metal salt, coagulation by adding organic solvent, and freezing coagulation. The coagulating agent for acid coagulation may be any known coagulating agent, such as hydrochloric acid, sulfuric acid, or nitric acid. The coagulating agent for salt coagulation may be any known coagulating agent, such as sodium sulfate, magnesium sulfate, or aluminum sulfate. The coagulation may be followed by washing with water or an organic solvent to remove residual components such as a surfactant, a polymerization initiator, a chain-transfer agent, and an excessive coagulating agent. The wet polymer is then dried, whereby dry powder is obtained.

The aforementioned emulsion polymerization can easily copolymerize vinylidene fluoride, tetrafluoroethylene, the monomer (2-2), and optionally a different monomer.

The amounts of monomers to be copolymerized with vinylidene fluoride and tetrafluoroethylene (i.e., the monomer (2-2) and an optional different monomer) are decided in consideration of the properties of the resulting copolymer, such as the adhesiveness, chemical resistance, molecular weight, and polymerization yield.

The binder of the invention may contain one or two or more additional components as long as the binder contains the fluorine-containing polymer.

Examples of the additional components to be contained in the binder include vinylidene fluoride (VdF) polymers, polymethacrylate, polymethyl methacrylate, polyacrylonitrile, polyimide, polyamide, polyamide-imide, polycarbonate, styrene rubber, and butadiene rubber. Preferred are VdF polymers.

The amount of these additional components is preferably 10 to 900 mass % relative to the fluorine-containing polymer.

Examples of the VdF polymers include polyvinylidene fluoride (PVdF), VdF/tetrafluoroethylene (TFE) copolymers, VdF/hexafluoropropylene (HFP) copolymers, VdF/chlorotrifluoroethylene (CTFE) copolymers, and VdF/2,3,3,3-tetrafluoropropene copolymers.

The VdF polymers each preferably have a weight average molecular weight (polystyrene equivalent) of 50000 to 2000000. The weight average molecular weight is more preferably 80000 to 1700000, still more preferably 100000 to 1500000.

The weight average molecular weight can be determined by gel permeation chromatography (GPC) using N,N-dimethylformamide as a solvent at 50° C.

The VdF polymer preferably has a number average molecular weight (polystyrene equivalent) of 35000 to 1400000. The number average molecular weight is more preferably 40000 to 1300000, still more preferably 50000 to 1200000.

The number average molecular weight can be determined by gel permeation chromatography (GPC) using N,N-dimethylformamide as a solvent at 50° C.

The PVdF may be a homopolymer consisting of a polymerized unit based on VdF (VdF unit), or may contain a polymerized unit based on VdF and a polymerized unit based on a monomer (x) copolymerizable with VdF.

Examples of the monomer (x) include tetrafluoroethylene, vinyl fluoride, trifluoroethylene, chlorotrifluoroethylene, fluoroalkyl vinyl ether, hexafluoropropylene, 2,3,3,3-tetrafluoropropene, and propylene. Examples thereof also include unsaturated dibasic acid monoesters, such as those disclosed in JP H06-172452 A, including monomethyl maleate, monomethyl citraconate, monoethyl citraconate, and vinylene carbonate; those disclosed in JP H07-201316 A, such as compounds containing a hydrophilic polar group (e.g., —$SO_3M$, —$OSO_3M$, —COOM, and —$OPO_3M$ (where M is an alkali metal), and an amine polar group (e.g., —$NHR^a$ and —$NR^bR^c$ (where $R^a$, $R^b$, and $R^c$ are each an alkyl group)), including $CH_2$=CH—$CH_2$-A, $CH_2$=C($CH_3$)—$CH_2$-A, $CH_2$=CH—$CH_2$—O—CO—CH($CH_2COOR^d$)-A, $CH_2$=CH—$CH_2$—O—$CH_2$—CH(OH)—$CH_2$-A, $CH_2$=C($CH_3$)—CO—O—$CH_2$—$CH_2$—$CH_2$-A, $CH_2$=CH—CO—O—$CH_2$—$CH_2$-A, and $CH_2$=CHCO—NH—C($CH_3$)$_2$—$CH_2$-A (where A is a hydrophilic polar group; and $R^d$ is an alkyl group), and maleic acid and maleic anhydride. Further, the copolymerizable monomer to be used may also be any of hydroxylated allyl ether monomers such as $CH_2$=CH—$CH_2$—O—$(CH_2)_n$—OH (3≤n≤8),

[Chem. 3]

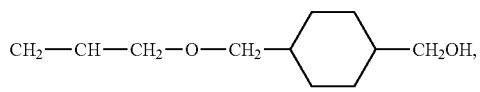

$CH_2$=CH—$CH_2$—O—$(CH_2$—$CH_2$—O)$_n$—H (1≤n≤14), and $CH_2$=CH—$CH_2$—O—$(CH_2$—CH($CH_3$)—O)$_n$—H (1≤n≤14), and allyl ether and ester monomers substituted with carboxy and/or —$(CF_2)_n$—$CF_3$ (3≤n≤8), such as $CH_2$=CH—$CH_2$—O—CO—$C_2H_4$—COOH, $CH_2$=CH—$CH_2$—O—CO—$C_5H_{10}$—COOH, $CH_2$=CH—$CH_2$—O—$C_2H_4$—$(CF_2)_n$$CF_3$, $CH_2$=CH—$CH_2$—CO—O—$C_2H_4$—$(CF_2)_n$$CF_3$, and $CH_2$=C($CH_3$)—CO—O—$CH_2$—$CF_3$. The researches so far enables analogical inference that compounds other than those containing a polar group as mentioned above can also improve the adhesiveness to a current collector made of metal foil such as aluminum or copper by slightly reducing the crystallinity of the fluorine-containing polymer and giving flexibility to the material. Thereby, the copolymerizable monomer to be used may also be any of unsaturated hydrocarbon monomers ($CH_2$=CHR, where R is a hydrogen atom, an alkyl group, or a halogen such as Cl) such as ethylene and propylene, fluoromonomers such as ethylene trifluoride chloride, hexafluoropropylene, hexafluoroisobutene, $CF_2$=CF—O—$C_nF_{2n+1}$ (where n is an integer of 1 or greater), $CH_2$=CF—$C_nF_{2n+1}$ (where n is an integer of 1 or greater), $CH_2$=CF—$(CF_2CF_2)_n$H (where n is an integer of 1 or greater), and $CF_2$=CF—O—$(CF_2CF(CF_3)O)_m$—$C_nF_{2n+1}$ (where m and n are each an integer of 1 or greater).

The copolymerizable monomer to be used may also be a fluorine-containing ethylenic monomer containing at least one functional group represented by the following formula:

[Chem. 4]

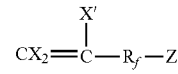

(wherein Z is —$CH_2OH$, —COOH, a carboxylic acid salt, a carboxy ester group, or an epoxy group; X and X' are the same as or different from each other, and are each a hydrogen atom or a fluorine atom; and $R_f$ is a C1-C40 divalent fluorine-containing alkylene group or a C1-C40 divalent fluorine-containing alkylene group containing ether bond). Copolymerization of one or two or more of these monomers can further improve the adhesiveness to a current collector, can prevent separation of the electrode active material from the current collector even after repeated charge and discharge, and can provide good charge and discharge cycle characteristics.

The PVdF preferably contains a polymerized unit based on the monomer (x) in an amount of 5 mol % or less, more preferably 4.5 mol % or less, still more preferably less than 4 mol %, further more preferably less than 3 mol %, of all the polymerized units.

The PVdF preferably has a weight average molecular weight (polystyrene equivalent) of 50000 to 2000000. The weight average molecular weight is more preferably 80000 to 1700000, still more preferably 100000 to 1500000.

The weight average molecular weight can be determined by gel permeation chromatography (GPC) using N,N-dimethylformamide as a solvent at 50° C.

The PVdF preferably has a number average molecular weight (polystyrene equivalent) of 35000 to 1400000.

The PVdF having a number average molecular weight of lower than 35000 may give poor adhesiveness to the resulting electrode. The PVdF having a number average molecular weight of higher than 1400000 may cause easy gelling during preparation of the electrode mixture.

The number average molecular weight is preferably 40000 or higher, more preferably 50000 or higher, still more preferably 60000 or higher, while preferably 1300000 or lower, more preferably 1200000 or lower.

The number average molecular weight can be determined by gel permeation chromatography (GPC) using N,N-dimethylformamide as a solvent at 50° C.

The PVdF may be produced by a conventionally known method including, for example, mixing monomers constituting polymerized units such as VdF and the monomer (x) and additives such as a polymerization initiator as appropriate, and then performing solution polymerization, suspension polymerization, or emulsion polymerization.

The VdF/TFE copolymer is a copolymer containing a polymerized unit based on VdF (VdF unit) and a polymerized unit based on TFE (TFE unit).

The VdF/TFE copolymer preferably contains the VdF unit in an amount of 50 to 95 mol % of all the polymerized units. Less than 50 mol % of the VdF unit tends to cause a great change in viscosity of the electrode mixture over time. More than 95 mol % thereof tends to cause poor flexibility of the electrode to be obtained from the mixture.

The VdF/TFE copolymer preferably contains the VdF unit in an amount of 55 mol % or more, more preferably 60 mol % or more, of all the polymerized units. The VdF/TFE copolymer more preferably contains the VdF unit in an amount of 92 mol % or less, still more preferably 89 mol % or less, of all the polymerized units.

The composition of the VdF/TFE copolymer can be determined using a NMR analyzer.

In addition to the VdF unit and the TFE unit, the VdF/TFE copolymer may further contain a polymerized unit based on a monomer copolymerizable with VdF and TFE. A copolymer of VdF and TFE is sufficient to achieve the effects of the invention, but the adhesiveness can be further improved by copolymerizing a monomer copolymerizable with these monomers to the extent that does not impair excellent swelling resistance against the electrolytic solution of the copolymer.

The amount of the polymerized unit based on the monomer copolymerizable with VdF and TFE is preferably less than 3.0 mol % of all the polymerized units of the VdF/TFE copolymer. Not less than 3.0 mol % of this polymerized unit typically tends to significantly reduce the crystallinity of the copolymer of VdF and TFE, reducing the swelling resistance against the electrolytic solution.

Examples of the monomer copolymerizable with VdF and TFE include unsaturated dibasic acid monoesters, such as those disclosed in JP H06-172452 A, including monomethyl maleate, monomethyl citraconate, monoethyl citraconate, and vinylene carbonate; those disclosed in JP H07-201316 A, such as compounds containing a hydrophilic polar group (e.g., —SO$_3$M, —OSO$_3$M, —COOM, and —OPO$_3$M (where M is an alkali metal), and an amine polar group (e.g., —NHR$^a$ and —NR$^b$R$^c$ (where R$^a$, R$^b$, and R$^c$ are each an alkyl group)), including CH$_2$=CH—CH$_2$-A, CH$_2$=C(CH$_3$)—CH$_2$-A, CH$_2$=CH—CH$_2$—O—CO—CH(CH$_2$COOR$^d$)-A, CH$_2$=CH—CH$_2$—O—CH$_2$—CH(OH)—CH$_2$-A, CH$_2$=C(CH$_3$)—CO—O—CH$_2$—CH$_2$—CH$_2$-A, CH$_2$=CH—CO—O—CH$_2$—CH$_2$-A, and CH$_2$=CHCO—NH—C(CH$_3$)$_2$—CH$_2$-A (where A is a hydrophilic polar group; and R$^d$ is an alkyl group), and maleic acid and maleic anhydride. Further, the copolymerizable monomer to be used may also be any of hydroxylated allyl ether monomers such as CH$_2$=CH—CH$_2$—O—(CH$_2$)$_n$—OH (3≤n≤8),

[Chem. 5]

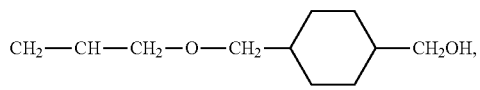

CH$_2$=CH—CH$_2$—O—(CH$_2$—CH$_2$—O)$_n$—H (1≤n≤14), and CH$_2$=CH—CH$_2$—O—(CH$_2$—CH(CH$_3$)—O)$_n$—H (1≤n≤14), and allyl ether and ester monomers substituted with carboxy and/or —(CF$_2$)$_n$—CF$_3$ (3≤n≤8), such as CH$_2$=CH—CH$_2$—O—CO—C$_2$H$_4$—COOH, CH$_2$=CH—CH$_2$—O—CO—C$_5$H$_{10}$—COOH, CH$_2$=CH—CH$_2$—O—C$_2$H$_4$—(CF$_2$)—CF$_3$, CH$_2$=CH—CH$_2$—CO—O—C$_2$H$_4$—(CF$_2$)—CF$_3$, and CH$_2$=C(CH$_3$)—CO—CH$_2$—CF$_3$.

The researches so far enables analogical inference that compounds other than those containing a polar group as mentioned above can also improve the adhesiveness to a current collector made of metal foil such as aluminum or copper by slightly reducing the crystallinity of the fluorine-containing polymer and giving flexibility to the material. Thereby, the copolymerizable monomer to be used may also be any of unsaturated hydrocarbon monomers (CH$_2$=CHR, where R is a hydrogen atom, an alkyl group, or a halogen such as Cl) such as ethylene and propylene, fluoromonomers such as ethylene trifluoride chloride, hexafluoropropylene, hexafluoroisobutene, 2,3,3,3-tetrafluoropropene, CF$_2$=CF—O—C$_n$F$_{2n+3}$. (where n is an integer of 1 or greater), CH$_2$=CF—C$_n$F$_{2n+1}$ (where n is an integer of 1 or greater), CH$_2$=CF—(CF$_2$CF$_2$)$_n$H (where n is an integer of 1 or greater), and CF$_2$=CF—O—(CF$_2$CF(CF$_3$)O)$_m$—C$_n$F$_{2n+1}$ (where m and n are each an integer of 1 or greater).

The copolymerizable monomer to be used may also be a fluorine-containing ethylenic monomer containing at least one functional group represented by the following formula:

[Chem. 6]

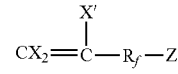

(wherein Z is —CH$_2$OH, —COOH, a carboxylic acid salt, a carboxy ester group, or an epoxy group; X and X' are the same as or different from each other, and are each a hydrogen atom or a fluorine atom; and R$_f$ is a C1-C40 divalent fluorine-containing alkylene group or a C1-C40 divalent fluorine-containing alkylene group containing ether bond). Copolymerization of one or two or more of these monomers can further improve the adhesiveness to a current collector, can prevent separation of the electrode active material from the current collector even after repeated charge and discharge, and can provide good charge and discharge cycle characteristics.

In terms of flexibility and chemical resistance, particularly preferred among these monomers are hexafluoropropylene and 2,3,3,3-tetrafluoropropene.

As mentioned above, the VdF/TFE copolymer may further contain a polymerized unit different from the VdF unit and the TFE unit. Still, the VdF/TFE copolymer more preferably consists of the VdF unit and the TFE unit.

The VdF/TFE copolymer preferably has a weight average molecular weight (polystyrene equivalent) of 50000 to 2000000. The weight average molecular weight is more preferably 80000 to 1700000, still more preferably 100000 to 1500000.

The weight average molecular weight can be determined by gel permeation chromatography (GPC) using N,N-dimethylformamide as a solvent at 50° C.

The VdF/TFE copolymer preferably has a number average molecular weight (polystyrene equivalent) of 35000 to 1400000. The number average molecular weight is more preferably 40000 to 1300000, still more preferably 50000 to 1200000.

The number average molecular weight can be determined by gel permeation chromatography (GPC) using N,N-dimethylformamide as a solvent at 50° C.

The VdF/TFE copolymer may be produced by a method including, for example, mixing the monomers constituting the polymerized units such as VdF and TFE and additives such as a polymerization initiator as appropriate and then performing suspension polymerization, emulsion polymerization, or solution polymerization. In consideration of easy aftertreatment, aqueous suspension polymerization or emulsion polymerization is preferred.

In the above polymerization, a polymerization initiator, a surfactant, a chain-transfer agent, and a solvent may be used, each of which may be any conventionally known one.

The VdF/HFP copolymer is a copolymer containing a polymerized unit based on VdF (VdF unit) and a polymerized unit based on HFP (HFP unit).

The VdF/HFP copolymer preferably contains the VdF unit in an amount of 80 to 98 mol % of all the polymerized units. Less than 80 mol % of the VdF unit tends to cause large swelling of the electrode to be obtained in an electrolytic solution, significantly impairing the battery characteristics. More than 98 mol % thereof tends to cause poor flexibility of the electrode to be obtained from the mixture.

The VdF/HFP copolymer more preferably contains the VdF unit in an amount of 83 mol % or more, still more preferably 85 mol % or more, of all the polymerized units. The VdF/HFP copolymer more preferably contains the VdF unit in an amount of 97 mol % or less, still more preferably 96 mol % or less, of all the polymerized units.

The composition of the VdF/HFP copolymer can be determined using a NMR analyzer.

In addition to the VdF unit and the HFP unit, the VdF/HFP copolymer may further contain a polymerized unit based on a monomer copolymerizable with VdF and HFP. A copolymer of VdF and HFP is sufficient to achieve the effects of the invention, but the adhesiveness can be further improved by copolymerizing a monomer copolymerizable with these monomers to the extent that does not impair excellent swelling resistance against the electrolytic solution of the copolymer.

The amount of the polymerized unit based on the monomer copolymerizable with VdF and HFP is preferably less than 3.0 mol % of all the polymerized units of the VdF/HFP copolymer. Not less than 3.0 mol % of this polymerized unit typically tends to significantly reduce the crystallinity of the copolymer of VdF and HFP, reducing the swelling resistance against the electrolytic solution.

Examples of the monomer copolymerizable with VdF and HFP include the same monomers as the monomers copolymerizable with VdF and TFE mentioned for the VdF/TFE copolymer, and TFE.

The VdF/HFP copolymer preferably has a weight average molecular weight (polystyrene equivalent) of 50000 to 2000000. The weight average molecular weight is more preferably 80000 to 1700000, still more preferably 100000 to 1500000.

The weight average molecular weight can be determined by gel permeation chromatography (GPC) using N,N-dimethylformamide as a solvent at 50° C.

The VdF/HFP copolymer preferably has a number average molecular weight (polystyrene equivalent) of 35000 to 1400000. The number average molecular weight is more preferably 40000 to 1300000, still more preferably 50000 to 1200000.

The number average molecular weight can be determined by gel permeation chromatography (GPC) using N,N-dimethylformamide as a solvent at 50° C.

The VdF/HFP copolymer may be produced by a method including, for example, mixing the monomers constituting the polymerized units such as VdF and HFP and additives such as a polymerization initiator as appropriate and then performing suspension polymerization, emulsion polymerization, or solution polymerization. In consideration of easy aftertreatment, aqueous suspension polymerization or emulsion polymerization is preferred.

In the above polymerization, a polymerization initiator, a surfactant, a chain-transfer agent, and a solvent may be used, each of which may be any conventionally known one.

The VdF/CTFE copolymer is a copolymer containing a polymerized unit based on VdF (VdF unit) and a polymerized unit based on CTFE (CTFE unit).

The VdF/CTFE copolymer preferably contains the VdF unit in an amount of 80 to 98 mol % of all the polymerized units. Less than 80 mol % or more than 98 mol % of the VdF unit may cause a great change in viscosity of the electrode mixture over time. The VdF/CTFE copolymer more preferably contains the VdF unit in an amount of 97.5 mol % or less, still more preferably 97 mol % or less, of all the polymerized units.

The VdF/CTFE copolymer preferably contains the VdF unit in an amount of 85 mol % or more, more preferably 90 mol % or more, of all the polymerized units.

The composition of the VdF/CTFE copolymer can be determined using a NMR analyzer.

In addition to the VdF unit and the CTFE unit, the VdF/CTFE copolymer may further contain a polymerized unit based on a monomer copolymerizable with VdF and CTFE. A copolymer of VdF and CTFE is sufficient to achieve the effects of the invention, but the adhesiveness can be further improved by copolymerizing a monomer copolymerizable with these monomers to the extent that does not impair excellent swelling resistance against the electrolytic solution of the copolymer.

The amount of the polymerized unit based on the monomer copolymerizable with VdF and CTFE is preferably less than 3.0 mol % of all the polymerized units of the VdF/CTFE copolymer. Not less than 3.0 mol % of this polymerized unit typically tends to significantly reduce the crystallinity of the copolymer of VdF and CTFE, reducing the swelling resistance against the electrolytic solution.

Examples of the monomer copolymerizable with VdF and CTFE include the same monomers as the monomers copolymerizable with VdF and TFE mentioned for the VdF/TFE copolymer, TFE, and HFP.

The VdF/CTFE copolymer preferably has a weight average molecular weight (polystyrene equivalent) of 50000 to 2000000. The weight average molecular weight is more preferably 80000 to 1700000, still more preferably 100000 to 1500000.

The weight average molecular weight can be determined by gel permeation chromatography (GPC) using N,N-dimethylformamide as a solvent at 50° C.

The VdF/CTFE copolymer preferably has a number average molecular weight (polystyrene equivalent) of 35000 to 1400000. The number average molecular weight is more preferably 40000 to 1300000, still more preferably 50000 to 1200000.

The number average molecular weight can be determined by gel permeation chromatography (GPC) using N,N-dimethylformamide as a solvent at 50° C.

The VdF/CTFE copolymer may be produced by a method including, for example, mixing the monomers constituting the polymerized units such as VdF and CTFE and additives such as a polymerization initiator as appropriate and then performing suspension polymerization, emulsion polymerization, or solution polymerization. In consideration of easy aftertreatment, aqueous suspension polymerization or emulsion polymerization is preferred.

In the above polymerization, a polymerization initiator, a surfactant, a chain-transfer agent, and a solvent may be used, each of which may be any conventionally known one.

The VdF/2,3,3,3-tetrafluoropropene copolymer is a copolymer containing a polymerized unit based on VdF (VdF unit) and a polymerized unit based on 2,3,3,3-tetrafluoropropene (2,3,3,3-tetrafluoropropene unit).

The VdF/2,3,3,3-tetrafluoropropene copolymer preferably contains the VdF unit in an amount of 80 to 98 mol % of all the polymerized units. Less than 80 mol % or more than 98 mol % of the VdF unit may cause a great change in viscosity of the electrode mixture over time. The VdF/2,3,3,3-tetrafluoropropene copolymer more preferably contains the VdF unit in an amount of 97.5 mol % or less, still more preferably 97 mol % or less, of all the polymerized units.

The VdF/2,3,3,3-tetrafluoropropene copolymer preferably contains the VdF unit in an amount of 85 mol % or more, more preferably 90 mol % or more, of all the polymerized units.

The composition of the VdF/2,3,3,3-tetrafluoropropene copolymer can be determined using a NMR analyzer.

In addition to the VdF unit and the 2,3,3,3-tetrafluoropropene unit, the VdF/2,3,3,3-tetrafluoropropene copolymer may further contain a polymerized unit based on a monomer copolymerizable with VdF and 2,3,3,3-tetrafluoropropene. A copolymer of VdF and 2,3,3,3-tetrafluoropropene is sufficient to achieve the effects of the invention, but the adhesiveness can be further improved by copolymerizing a monomer copolymerizable with these monomers to the extent that does not impair excellent swelling resistance against the electrolytic solution of the copolymer.

The amount of the polymerized unit based on the monomer copolymerizable with VdF and 2,3,3,3-tetrafluoropropene is preferably less than 3.0 mol % of all the polymerized units of the VdF/2,3,3,3-tetrafluoropropene copolymer. Not less than 3.0 mol % of this polymerized unit typically tends to significantly reduce the crystallinity of the copolymer of VdF and 2,3,3,3-tetrafluoropropene, reducing the swelling resistance against the electrolytic solution.

Examples of the monomer copolymerizable with VdF and 2,3,3,3-tetrafluoropropene include the same monomers as the monomers copolymerizable with VdF and TFE mentioned for the VdF/TFE copolymer, TFE, and HFP.

The VdF/2,3,3,3-tetrafluoropropene copolymer preferably has a weight average molecular weight (polystyrene equivalent) of 50000 to 2000000. The weight average molecular weight is more preferably 80000 to 1700000, still more preferably 100000 to 1500000.

The weight average molecular weight can be determined by gel permeation chromatography (GPC) using N,N-dimethylformamide as a solvent at 50° C.

The VdF/2,3,3,3-tetrafluoropropene copolymer preferably has a number average molecular weight (polystyrene equivalent) of 35000 to 1400000. The number average molecular weight is more preferably 40000 to 1300000, still more preferably 50000 to 1200000.

The number average molecular weight can be determined by gel permeation chromatography (GPC) using N,N-dimethylformamide as a solvent at 50° C.

The VdF/2,3,3,3-tetrafluoropropene copolymer may be produced by a method including, for example, mixing the monomers constituting the polymerized units such as VdF and 2,3,3,3-tetrafluoropropene and additives such as a polymerization initiator as appropriate and then performing suspension polymerization, emulsion polymerization, or solution polymerization. In consideration of easy aftertreatment, aqueous suspension polymerization or emulsion polymerization is preferred.

In the above polymerization, a polymerization initiator, a surfactant, a chain-transfer agent, and a solvent may be used, each of which may be any conventionally known one.

The VdF polymer is preferably PVdF or the VdF/TFE copolymer, more preferably PVdF, among those mentioned above.

The mass ratio of the fluorine-containing polymer to the VdF polymer (fluorine-containing polymer)/(VdF polymer) is preferably 90/10 to 10/90, more preferably 80/20 to 13/87, still more preferably 75/25 to 15/85.

The binder of the invention may be used for a secondary battery. The fluorine-containing polymer has good adhesiveness to a current collector and excellent flexibility, and thus is suitable as a binder for an electrode of a secondary battery. The binder of the invention can also be used as a binder for a separator coating of a secondary battery. The binder for a secondary battery herein includes binders used for a positive electrode, a negative electrode, and a separator of a secondary battery. The secondary battery is preferably a lithium ion secondary battery.

The binder of the invention may constitute an electrode mixture together with an active material and water or a nonaqueous solvent. The secondary battery to which the binder of the invention is applied includes a positive electrode containing a positive electrode mixture carried on a positive electrode current collector, a negative electrode containing a negative electrode mixture carried on a negative electrode current collector, and an electrolytic solution.

The following describes an example of a mixture for producing an electrode of a battery using the binder of the invention.

For nonaqueous electrolytic solution batteries containing an organic or nonaqueous electrolytic solution as an electrolytic solution, such as lithium ion secondary batteries, the active material layer is made thin and the area of the electrode is increased so as to improve the heavy load performance due to a low electrical conductivity of the nonaqueous electrolytic solution.

In order to achieve these properties, production of an electrode is examined in which a composition for forming an electrode mixture containing a powdery active material, a conductive agent such as carbon, and a binder is applied and bonded to a current collector made of foil or net of metal such as iron, stainless steel, copper, aluminum, nickel, or titanium. The amount of the binder used needs to be reduced as small as possible. Thus, the binder needs to hold the components such as an active material and have excellent adhesiveness to a current collector even when used in a small amount. The binder typically insulates the electricity, so that an increased amount of the binder increases the internal resistance of the battery. Also, in this respect, the amount of the binder for providing its functions needs to be as small as possible.

The amount of the binder is preferably typically very small, and is preferably 30 mass % or less of the whole electrode mixture. Such a small amount of the binder fails to completely fill the gaps between fine particle components of the electrode mixture or gaps between the fine particle component and the current collector. In the case of coatings containing filler such as pigments or lining materials, a large amount of binder sufficient to completely fill the gaps between filler components is used. Thus, problems relating to holding of filler hardly arise. In contrast, in the case of binders for electrodes, the amount thereof is very small as mentioned above. Thus, a binder is demanded which can hold the active material well and has excellent adhesiveness to a current collector even when used in a small amount.

The invention also relates to an electrode mixture for a secondary battery, comprising a mixture containing at least: the aforementioned binder for a secondary battery of the invention, a powdery electrode material for a battery, and water or a nonaqueous solvent. The electrode mixture is preferably an electrode mixture for a secondary battery prepared by mixing a solution or dispersion containing the aforementioned binder for a secondary battery of the invention dispersed or dissolved in water or a nonaqueous solvent, and a powdery electrode material for a battery.

The electrode mixture is more preferably an electrode mixture for a lithium ion secondary battery. The electrode mixture of the invention contains the aforementioned binder, and thus can form an electrode material layer excellent in the adhesiveness to a current collector and the flexibility. The electrode mixture may be a positive electrode mixture used for production of a positive electrode, or may be a negative electrode mixture used for production of a negative electrode. It is preferably a positive electrode mixture.

The powdery electrode material preferably contains an electrode active material. The electrode active material is divided into a positive electrode active material and a negative electrode active material. In the case of lithium ion secondary batteries, the positive electrode active material may be any one capable of electrochemically occluding and releasing lithium ions. Preferred are lithium composite oxides, more preferably lithium transition metal composite oxides. The positive electrode active material is also preferably a lithium-containing transition metal phosphate compound. The positive electrode active material is also preferably a substance containing lithium and at least one transition metal, such as a lithium transition metal composite oxide or a lithium-containing transition metal phosphate compound.

The transition metal in the lithium transition metal composite oxide is preferably, but not limited to, V, Ti, Cr, Mn, Fe, Co, Ni, and Cu. Specific examples of the lithium transition metal composite oxide include lithium cobalt oxides such as $LiCoO_2$, lithium nickel oxides such as $LiNiO_2$, lithium manganese oxides such as $LiMnO_2$, $LiMn_2O_4$, and $Li_2MnO_3$, and those derived from these lithium transition metal composite oxides in which some of the main transition metal atoms are replaced by metal atoms such as Al, Ti, V, Cr, Mn, Fe, Co, Li, Ni, Cu, Zn, Mg, Ga, Zr, or Si. Examples of the compounds prepared by the substitution include lithium nickel manganese oxides, lithium nickel cobalt aluminum oxides, lithium nickel cobalt manganese oxides, lithium manganese aluminum oxides, and lithium titanium oxides. Specific examples thereof include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$, $LiMn_{1.8}Al_{0.2}O_4$, $LiMn_{1.5}Ni_{0.5}O_4$, $Li_4Ti_5O_{12}$, and $LiNi_{0.82}Co_{0.15}Al_{0.03}O_2$.

The transition metal in the lithium-containing transition metal phosphate compound is preferably, but not limited to, V, Ti, Cr, Mn, Fe, Co, Ni, or Cu. Specific examples of the lithium-containing transition metal phosphate compound include iron phosphates such as $LiFePO_4$, $Li_3Fe_2(PO_4)_3$, and $LiFeP_2O_7$, cobalt phosphates such as $LiCoPO_4$, and those derived from these lithium transition metal phosphate compounds in which some of the main transition metal atoms are replaced by metal atoms such as Al, Ti, V, Cr, Mn, Fe, Co, Li, Ni, Cu, Zn, Mg, Ga, Zr, Nb, or Si.

In terms of high voltage, high energy density, or charge and discharge cycle characteristics, particularly preferred are $LiCoO_2$, $LiNiO_2$, $LiMn_2O_4$, $LiNi_{0.82}Co_{0.15}Al_{0.03}O_2$, $LiNi_{0.33}Mn_{0.33}Co_{0.33}O_2$, $LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$, and $LiFePO_4$.

Also, to the surface of these positive electrode active materials may be attached a substance which has a composition different from that of the main substance constituting the positive electrode active material. Examples of the surface-attaching substance include oxides such as aluminum oxide, silicon oxide, titanium oxide, zirconium oxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, and carbonates such as lithium carbonate, calcium carbonate, and magnesium carbonate.

These surface-attaching substances can be attached to the surface of the positive electrode active material by, for example, a method in which the substance is dissolved or suspended in a solvent, the solution or suspension is impregnated into the positive electrode active material, and the workpiece is dried; a method in which the surface-attaching substance precursor is dissolved or suspended in a solvent, the solution or suspension is impregnated into the positive electrode active material, and they are reacted with each other by heating; or a method in which the substance is added to a positive electrode active material precursor and they are fired simultaneously.

The lower limit of the amount by mass of the surface-attaching substance is preferably 0.1 ppm or more, more preferably 1 ppm or more, still more preferably 10 ppm or more, while the upper limit thereof is preferably 20% or less, more preferably 10% or less, still more preferably 5% or less, relative to the positive electrode active material. The surface-attaching substance can reduce oxidation reaction of the nonaqueous electrolytic solution on the surface of the positive electrode active material, improving the battery life. Too small an amount thereof may fail to sufficiently provide the effects thereof. Too large an amount thereof may inhibit occlusion and release of lithium ions, increasing the resistance.

Particles of the positive electrode active material have a conventionally known shape such as a massive shape, polyhedral shape, spherical shape, ellipsoidal shape, plate shape, needle shape, or pillar shape. Preferably, primary particles agglomerate to form secondary particles and such secondary particles have a spherical or ellipsoidal shape. In typical electrochemical devices, the active material in an electrode expands and contracts during charge and discharge. The stress of such expansion and contraction is likely to cause impairment such as breakage of the active material and breakage of conductive paths. Thus, the active material is more preferably in the form of secondary particles formed by agglomeration of primary particles than in the form of primary particles alone because such a form can ease the stress of expansion and contraction and reduce impairment. Further, spherical or ellipsoidal particles are more preferred than axially oriented particles, such as plate-like particles, because such particles show less orientation in molding of electrodes, causes less expansion and contraction of electrodes during charge and discharge, and are likely to be uniformly mixed with a conductive agent in formation of electrodes.

The positive electrode active material typically has a tap density of 1.3 $g/cm^3$ or higher, preferably 1.5 $g/cm^3$ or higher, still more preferably 1.6 $g/cm^3$ or higher, most preferably 1.7 $g/cm^3$ or higher. The positive electrode active material having a tap density below the lower limit may cause an increase in the amount of dispersion medium required and the amounts of additives such as a conductive material and a binder required in formation of the positive electrode active material layer, restricting the proportion of the positive electrode active material filled into the positive electrode active material layer and restricting the battery capacity. A powdery metal composite oxide having a high tap density can provide a high-density positive electrode active material layer. The tap density is usually preferably as high as possible and has no upper limit. Still, too high a tap density may limit diffusion of lithium ions in the positive electrode active material layer through the medium of a nonaqueous electrolytic solution and may cause easy reduction in load characteristics. Thus, the tap density is usually 2.5 g/cm$^3$ or lower, preferably 2.4 g/cm$^3$ or lower.

The tap density of the positive electrode active material is defined as follows. Specifically, a sample is passed through a sieve with an opening of 300 μm and is put into a 20-cm$^3$ tapping cell to fill the cell capacity. Tapping is then performed 1000 times with a stroke of 10 mm using a powder density meter (e.g., tap denser, Seishin Enterprise Co., Ltd.). The density calculated from the volume and the weight of the sample after the tapping is defined as the tap density.

The positive electrode active material particles typically have a median size d50 (secondary particle size in the case of secondary particles formed from agglomerated primary particles) of 0.1 μm or greater, preferably 0.5 μm or greater, more preferably 1 μm or greater, most preferably 3 μm or greater, while typically 20 μm or smaller, preferably 18 μm or smaller, more preferably 16 μm or smaller, most preferably 15 μm or smaller. The particles having a median size below the lower limit may fail to provide a article having a high bulk density. The particles having a median size above the upper limit may cause lithium in the particles to take a long time to diffuse, which may cause reduced battery performance and defects such as streaks in formation of a positive electrode of a battery, i.e., when the active material and additives such as a conductive agent and a binder are formed into slurry with a solvent and this slurry is applied in a sheet form. Use of two or more positive electrode active materials having different median sizes d50 as a mixture can further improve the packing easiness in formation of a positive electrode.

The median size d50 in the invention is measured using a known laser diffraction/scattering particle size distribution analyzer. In the case of a particle size distribution analyzer LA-920 (Horiba, Ltd.), the dispersion medium used in the measurement is a 0.1 mass % aqueous solution of sodium hexametaphosphate, and ultrasonic dispersion is performed for five minutes and the measurement refractive index is set to 1.24 before the measurement.

In the case of secondary particles formed by agglomerated primary particles, the average primary particle size of the positive electrode active material is typically 0.01 μm or greater, preferably 0.05 μm or greater, still more preferably 0.08 μm or greater, most preferably 0.1 μm or greater, while typically 3 μm or smaller, preferably 2 μm or smaller, still more preferably 1 μm or smaller, most preferably 0.6 μm or smaller. Primary particles having an average primary particle size above the upper limit are difficult to form spherical secondary particles. Such particles may affect powder packing and may have a greatly reduced specific surface area, highly possibly reducing the battery performance such as output characteristics. Primary particles having an average primary particle size below the lower limit typically contain ungrown crystals, causing problems such as poor reversibility of charge and discharge. The primary particle size is measured by observation using a scanning electron microscope (SEM). Specifically, in a 10000× photograph, the longest linear section between the left and right boundary of each primary particle in the horizontal direction is obtained for any 50 primary particles, and the average value thereof is calculated.

The positive electrode active material has a BET specific surface area of 0.2 m$^2$/g or larger, preferably 0.3 m$^2$/g or larger, still more preferably 0.4 m$^2$/g or larger, while 4.0 m$^2$/g or smaller, preferably 2.5 m$^2$/g or smaller, still more preferably 1.5 m$^2$/g or smaller. The active material having a BET specific surface area smaller than the above range is likely to cause reduced battery performance. The active material having a BET specific surface area larger than the above range is less likely to increase the tap density, causing problems of application of the material in formation of the positive electrode active material.

The BET specific surface area is defined by the value measured as follows. Specifically, a sample is pre-dried in nitrogen stream at 150° C. for 30 minutes, and the BET specific surface area of the sample is measured by the nitrogen adsorption single point BET method utilizing the flowing gas technique using a surface area analyzer (e.g., automatic surface area meter, Ohkura Riken, Inc.) with a gas mixture of nitrogen and helium whose nitrogen relative pressure is precisely controlled to 0.3 relative to the atmospheric pressure.

The positive electrode active material may be produced by a common method for producing an inorganic compound. In particular, various methods may be applied for production of a spherical or ellipsoidal active material. Examples thereof include: a method in which a transition metal material substance such as a transition metal nitrate or sulfate and optionally another element material substance are dissolved or pulverized and dispersed in a solvent such as water, the pH of the solution or dispersion is adjusted under stirring and a spherical precursor is formed and collected, the spherical precursor is optionally dried, a Li source such as LiOH, Li$_2$CO$_3$, or LiNO$_3$ is added thereto, and the mixture is fired at high temperature, whereby the active material is obtained; a method in which a transition metal material substance such as transition metal nitrate, sulfate, hydroxide, or oxide and optionally another element material substance is dissolved or pulverized and dispersed in a solvent such as water, the solution or dispersion is dried and shaped into a spherical or ellipsoidal precursor using a spray drier, a Li source such as LiOH, Li$_2$CO$_3$, or LiNO$_3$ is added thereto, and the mixture is fired at high temperature, whereby the active material is obtained; and a method in which a transition metal material substance such as transition metal nitrate, sulfate, hydroxide, or oxide, a Li source such as LiOH, Li$_2$CO$_3$, or LiNO$_3$, and optionally another element material substance are dissolved or pulverized and dispersed in a solvent such as water, the solution or dispersion is dried and shaped into a spherical or ellipsoidal precursor using a spray drier, and this precursor is fired at high temperature, whereby an active material is obtained.

In the invention, one powdery positive electrode active material may be used alone, or two or more powdery positive electrode active materials having different compositions or different powdery physical properties may be used in any combination at any ratio.

The negative electrode active material may be any one that can electrochemically occlude and release lithium ions. Examples thereof include carbonaceous materials, metal oxides such as tin oxide and silicon oxide, metal composite oxides, simple lithium and lithium alloys such as lithium aluminum alloy, and metals alloyable with lithium such as Sn and Si. These materials may be used alone or in any combination of two or more at any ratio. In terms of safety, preferred are carbonaceous materials and lithium composite oxides.

The metal composite oxides may be any of those capable of occluding and releasing lithium. In terms of high-current-density charge and discharge characteristics, preferred are those containing titanium and/or lithium as constituents.

In order to achieve good balance between the initial irreversible capacity and the high-current-density charge and discharge characteristics, the carbonaceous materials are preferably selected from:

(1) natural graphite, (2) artificial carbonaceous substances and artificial graphite substances; carbonaceous materials obtained by one or more heating treatments at 400° C. to 3200° C. on any of carbonaceous substances {e.g., natural graphite, coal-based coke, petroleum-based coke, coal-based pitch, petroleum-based pitch, and products of oxidizing these pitches, needle coke, pitch coke, and carbon materials produced by partially graphitizing them, furnace black, acetylene black, and pyrolysates of organic matter such as pitch-based carbon fibers, carbonizable organic matter (e.g., coal tar pitch ranging from soft pitch to hard pitch, coal-based heavy oil such as carbonized liquefied oil, straight heavy oil such as atmospheric residue and vacuum residue, decomposed petroleum heavy oil such as ethylene tar which is a by-product in thermal cracking of crude oil or naphtha, aromatic hydrocarbons such as acenaphthylene, decacyclene, anthracene, and phenanthrene, N-cyclic compounds such as phenazine and acridine, S-cyclic compounds such as thiophene and bithiophene, polyphenylenes such as biphenyl and terphenyl, polyvinyl chloride, polyvinyl alcohol, polyvinyl butyral, insolubilized products thereof, nitrogen-containing organic polymers such as polyacrylonitrile and polypyrrole, sulfur-containing organic polymers such as polythiophene and polystyrene, natural polymers such as polysaccharides typified by cellulose, lignin, mannan, polygalacturonic acid, chitosan, and saccharose, thermoplastic resins such as polyphenylene sulfide and polyphenylene oxide, and thermosetting resins such as furfuryl alcohol resin, phenol-formaldehyde resin, and imide resin), carbides thereof, solutions of carbonizable organic matter in a low-molecular-weight organic solvent such as benzene, toluene, xylene, quinoline, or n-hexane, and carbides thereof};

(3) carbonaceous materials which allow the negative electrode active material layer to contain at least two carbonaceous materials having different crystallinities and/or to have an interface between the carbonaceous materials having different crystallinities; and (4) carbonaceous materials which allow the negative electrode active material layer to contain at least two carbonaceous materials having different orientations and/or to have an interface between the carbonaceous materials having different orientations.

In order to increase the capacity of the electrode to be obtained, the amount of the electrode active material (positive electrode active material or negative electrode active material) is preferably 40 mass % or more in the electrode mixture.

The powdery electrode material may further contain a conductive agent. Examples of the conductive agent include carbon blacks such as acetylene black and Ketjen black, carbon materials such as graphite, carbon fiber, carbon nanotube, and carbon nanohorn.

The ratio by weight of the powdery components (active material and conductive agent) and the fluorine-containing polymer in the electrode mixture is typically about 80:20 to 99.5:0.5, and is determined in consideration of the retention of the powdery components, the adhesiveness to a current collector, and the conductivity of the electrode.

With the aforementioned ratio, the fluorine-containing polymer cannot completely fill the gaps between the powdery components in the electrode mixture layer formed on the current collector. Still, when a liquid that can well dissolve or disperse the fluorine-containing polymer is used as a solvent, the fluorine-containing polymer is uniformly dispersed in the form of mesh in the electrode mixture layer dried, retaining the powdery components well. Thus, the use of such a liquid is preferred.

Examples of the liquid include water and nonaqueous solvents. Examples of the nonaqueous solvents include general-purpose organic solvents with a low boiling point, including nitrogen-containing organic solvents such as N-methyl-2-pyrrolidone, N,N-dimethylacetamide, and dimethylformamide; ketone solvents such as acetone, methyl ethyl ketone, cyclohexanone, and methyl isobutyl ketone; ester solvents such as ethyl acetate and butyl acetate; ether solvents such as tetrahydrofuran and dioxane; and solvent mixtures thereof.

The liquid is preferably N-methyl-2-pyrrolidone and/or N,N-dimethylacetamide because they can lead to excellent stability and easy coating of the resulting electrode mixture.

The amount of the liquid in the electrode mixture is determined in consideration of factors such as the easiness of coating to a current collector and the thin-film-formability after drying. The ratio by weight of the binder and the liquid is typically preferably 0.5:99.5 to 20:80.

In order to rapidly dissolve or disperse the fluorine-containing polymer in the liquid, the fluorine-containing polymer in the use is preferably in the form of small particles with an average particle size of 1000 μm or smaller, particularly 50 to 350 μm.

In order to further improve the adhesiveness to a current collector, the electrode mixture may further contain any of acrylic resins such as polymethacrylate and polymethyl methacrylate, and polyimide, polyamide, and polyamide-imide resins. Further, a crosslinker may be added and radiation such as γ-rays or electron beams may be applied to form a crosslinking structure. The crosslinking may be achieved not only by irradiation but also by any other crosslinking technique. For example, a thermally crosslinkable amine-containing compound or cyanurate-containing compound may be added so as to perform thermal crosslinking.

In order to improve the dispersion stability of electrode slurry, the electrode mixture may contain a dispersant such as a resin-based or cationic surfactant or a nonionic surfactant having a surface-activating effect.

The proportion of the binder of the invention in the electrode mixture is preferably 0.1 to 20 mass %, more preferably 1 to 10 mass %, relative to the electrode mixture.

An electrode mixture containing the binder is usually produced by dissolving or dispersing the binder in the liquid, and then dispersing the powdery electrode material in the solution or dispersion and mixing them. The resulting electrode mixture is uniformly applied to a current collector such as metal foil or metal mesh, and then dried and optionally pressed, whereby a thin electrode mixture layer is formed on the current collector. This product serves as a thin film electrode.

In an alternative method, for example, binder powder and electrode material powder are mixed in advance, and then the liquid is added to form a mixture. In a still alternative method, for example, binder powder and electrode material powder are heat-melted and the molten material is extruded through an extruder to form a thin-film mixture, and this mixture is attached to a current collector with a conductive adhesive or a general-purpose organic solvent applied thereto, whereby an electrode sheet is produced. In a still alternative method, a solution or dispersion of the binder is applied to an electrode material that is preformed in advance. As mentioned above, the binder may be used in any methods.

The invention also relates to an electrode for a secondary battery containing the binder for a secondary battery of the invention. The electrode of the invention contains the aforementioned binder, and thus the electrode does not crack, does not cause falling of the powdery electrode material, and does not separate from the current collector even when the electrode material is applied thickly and then rolled or pressed so as to achieve densification.

The electrode preferably includes a current collector and an electrode material layer that is disposed on the current collector and contains the powdery electrode material and the binder. The electrode may be either a positive electrode or a negative electrode, and is preferably a positive electrode.

The current collector (positive electrode current collector and negative electrode current collector) may be metal foil or metal mesh of iron, stainless steel, copper, aluminum, nickel, or titanium, for example. The positive electrode current collector is preferably aluminum foil and the negative electrode current collector is preferably copper foil, for example.

The electrode of the invention can be produced by the aforementioned method, for example.

The invention also relates to a secondary battery including the aforementioned electrode for a secondary battery of the invention. In the secondary battery of the invention, at least one of the positive electrode and the negative electrode has only to be the aforementioned electrode for a secondary battery of the invention, and the positive electrode is preferably the aforementioned electrode for a secondary battery of the invention. The secondary battery is preferably a lithium ion secondary battery.

The secondary battery of the invention preferably further includes a nonaqueous electrolytic solution. The nonaqueous electrolytic solution may be any one, and an organic solvent of the electrolytic solution may be one or two or more of known hydrocarbon solvents such as propylene carbonate, ethylene carbonate, butylene carbonate, γ-butyrolactone, 1,2-dimethoxyethane, 1,2-diethoxyethane, dimethyl carbonate, and diethyl carbonate; and fluorosolvents such as fluoroethylene carbonate, fluoroether, and fluorinated carbonate. The electrolyte may be any conventionally known one, such as $LiClO_4$, $LiAsF_6$, $LiPF_6$, $LiBF_4$, $LiCl$, $LiBr$, $CH_3SO_3Li$, $CF_3SO_3Li$, or caesium carbonate. In order to further improve the adhesiveness to a current collector, the positive electrode mixture and/or the negative electrode mixture of the invention may also contain any of acrylic resins such as polymethacrylate and polymethyl methacrylate, and polyimide, polyamide, and polyamide-imide resins.

A separator may be disposed between the positive electrode and the negative electrode. The separator may be a conventionally known one, or may be a separator coated with the aforementioned binder of the invention.

Use of the aforementioned binder of the invention for at least one of the positive electrode, the negative electrode, and the separator of the secondary battery (preferably, lithium ion secondary battery) is also preferred.

A film for a secondary battery formed from the aforementioned binder of the invention is also one preferred aspect of the invention.

A laminate for a secondary battery including a substrate and a layer formed from the aforementioned binder of the invention on the substrate is also one preferred aspect of the invention. Examples of the substrate include those mentioned as examples of the current collector and known substrates for separators of secondary batteries (e.g., porous films).

EXAMPLES

The invention is described with reference to, but is not limited to, examples.

Polymerization Example 1 (Production of Fluorine-Containing Polymer A)

A 2-L autoclave provided with a stirrer was charged with 0.6 kg of pure water and 0.6 g of methyl cellulose and sufficiently purged with nitrogen. Then, 0.57 kg of 1,1,1,3,3-pentafluorobutane was put therein and the temperature inside the system was maintained at 37° C. A gas mixture of tetrafluoroethylene/vinylidene fluoride=5/95 (ratio by mole) was put into the autoclave, so that the pressure inside the container was adjusted to 1.5 MPa. Then, 0.20 g of 3-butenoic acid and 0.5 g of a 50 mass % methanol solution of di-n-propyl peroxydicarbonate were added, whereby the polymerization was initiated. A gas mixture of tetrafluoroethylene/vinylidene fluoride=10/90 (ratio by mole) was added so as to maintain the pressure inside the container, and 70 g in total of the gas mixture was fed before the completion of the reaction. In response to the feeding of gas mixture, 3-butanoic acid was continuously added, and 0.54 g in total thereof was added before the completion of the reaction. Completion of feeding 70 g of the gas mixture was followed by release of the gas inside the container, whereby the reaction was completed.

The reaction product was washed with water and dried, whereby 69 g of a fluorine-containing polymer A was obtained.

The composition and physical properties of the resulting fluorine-containing polymer A are shown in Table 1.

Polymerization Example 2 (Production of Fluorine-Containing Polymer B)

A 2-L autoclave provided with a stirrer was charged with 0.6 kg of pure water and 0.6 g of methyl cellulose and sufficiently purged with nitrogen. Then, 0.57 kg of 1,1,1,3,3-pentafluorobutane was put therein and the temperature inside the system was maintained at 37° C. A gas mixture of tetrafluoroethylene/vinylidene fluoride=7/93 (ratio by mole) was put into the autoclave, so that the pressure inside the container was adjusted to 1.5 MPa. Then 0.29 g of 3-butenoic acid and 0.5 g of a 50 mass % methanol solution of di-n-propyl peroxydicarbonate were added, whereby the polymerization was initiated. A gas mixture of tetrafluoroethylene/vinylidene fluoride=15/85 (ratio by mole) was added so as to maintain the pressure inside the container, and 70 g in total of the gas mixture was fed before the completion of the reaction. In response to the feeding of gas mixture, 3-butanoic acid was continuously added, and 0.44 g in total thereof was added before the completion of the reaction. Completion of feeding 70 g of the gas mixture was followed by release of the gas inside the container, whereby the reaction was completed.

The reaction product was washed with water and dried, whereby 69 g of a fluorine-containing polymer B was obtained.

The composition and physical properties of the resulting fluorine-containing polymer B are shown in Table 1.

Polymerization Example 3 (Production of Fluorine-Containing Polymer C)

A 2-L autoclave provided with a stirrer was charged with 0.6 kg of pure water and 0.6 g of methyl cellulose and sufficiently purged with nitrogen. Then, 0.57 kg of 1,1,1,3,3-pentafluorobutane was put therein and the temperature inside the system was maintained at 37° C. A gas mixture of tetrafluoroethylene/vinylidene fluoride=4/96 (ratio by mole) was put into the autoclave, so that the pressure inside the container was adjusted to 1.5 MPa. Then, 0.09 g of 4-pentenoic acid and 0.5 g of a 50 mass % methanol solution of di-n-propyl peroxydicarbonate were added, whereby the polymerization was initiated. A gas mixture of tetrafluoroethylene/vinylidene fluoride=11/89 (ratio by mole) was added so as to maintain the pressure inside the container, and 70 g in total of the gas mixture was fed before the completion of the reaction. In response to the feeding of gas mixture, 4-pentenoic acid was continuously added, and 0.36 g in total thereof was added before the completion of the reaction. Completion of feeding 70 g of the gas mixture was followed by release of the gas inside the container, whereby the reaction was completed.

The reaction product was washed with water and dried, whereby 68 g of a fluorine-containing polymer C was obtained.

The composition and physical properties of the resulting fluorine-containing polymer C are shown in Table 1.

Polymerization Example 4 (Production of Fluorine-Containing Polymer D)

A 2-L autoclave provided with a stirrer was charged with 0.6 kg of pure water and 0.6 g of methyl cellulose and sufficiently purged with nitrogen. Then, 0.57 kg of 1,1,1,3,3-pentafluorobutane was put therein and the temperature inside the system was maintained at 37° C. A gas mixture of tetrafluoroethylene/vinylidene fluoride=7/93 (ratio by mole) was put into the autoclave, so that the pressure inside the container was adjusted to 1.5 MPa. Then, 0.17 g of 4-pentenoic acid and 0.5 g of a 50 mass % methanol solution of di-n-propyl peroxydicarbonate were added, whereby the polymerization was initiated. A gas mixture of tetrafluoroethylene/vinylidene fluoride=15/85 (ratio by mole) was added so as to maintain the pressure inside the container, and 70 g in total of the gas mixture was fed before the completion of the reaction. In response to the feeding of gas mixture, 4-pentenoic acid was continuously added, and 0.43 g in total thereof was added before the completion of the reaction. Completion of feeding 70 g of the gas mixture was followed by release of the gas inside the container, whereby the reaction was completed.

The reaction product was washed with water and dried, whereby 69 g of a fluorine-containing polymer D was obtained.

The composition and physical properties of the resulting fluorine-containing polymer D are shown in Table 1

Polymerization Example 5 (Production of Fluorine-Containing Polymer E)

A 2-L autoclave provided with a stirrer was charged with 0.6 kg of pure water and 0.6 g of methyl cellulose and sufficiently purged with nitrogen. Then, 0.57 kg of 1,1,1,3,3-pentafluorobutane was put therein and the temperature inside the system was maintained at 37° C. A gas mixture of TFE/VdF=18/82 (ratio by mole) was put into the autoclave, so that the pressure inside the container was adjusted to 1.5 MPa. Then, 0.69 g of 3-butenoic acid and 1.6 g of a 50 mass % methanol solution of di-n-propyl peroxydicarbonate were added, whereby the polymerization was initiated. A gas mixture of TFE/VdF=33/67 (ratio by mole) was added so as to maintain the pressure inside the container, and 70 g in total of the gas mixture was fed before the completion of the reaction. In response to the feeding of gas mixture, 3-butanoic acid was continuously added, and 0.56 g in total thereof was added before the completion of the reaction. Completion of feeding 70 g of the gas mixture was followed by release of the gas inside the container, whereby the reaction was completed.

The reaction product was washed with water and dried, whereby 67 g of a fluorine-containing polymer E was obtained.

The composition and physical properties of the resulting fluorine-containing polymer E are shown in Table 1.

Polymerization Example 6 (Production of Fluorine-Containing Polymer F)

A 2-L autoclave provided with a stirrer was charged with 0.6 kg of pure water and 0.6 g of methyl cellulose and sufficiently purged with nitrogen. Then, 0.57 kg of 1,1,1,3,3-pentafluorobutane was put therein and the temperature inside the system was maintained at 37° C. A gas mixture of TFE/VdF=17/83 (ratio by mole) was put into the autoclave, so that the pressure inside the container was adjusted to 1.5 MPa. Then, 0.92 g of 3-butenoic acid and 1.4 g of a 50 mass % methanol solution of di-n-propyl peroxydicarbonate were added, whereby the polymerization was initiated. A gas mixture of TFE/VdF=32/68 (ratio by mole) was added so as to maintain the pressure inside the container, and 70 g in total of the gas mixture was fed before the completion of the reaction. In response to the feeding of gas mixture, 3-butanoic acid was continuously added, and 0.73 g in total thereof was added before the completion of the reaction. Completion of feeding 70 g of the gas mixture was followed by release of the gas inside the container, whereby the reaction was completed.

The reaction product was washed with water and dried, whereby 66 g of a fluorine-containing polymer F was obtained.

The composition and physical properties of the resulting fluorine-containing polymer F are shown in Table 1.

Polymerization Example 7 (Production of Fluorine-Containing Polymer G)

A 2-L autoclave provided with a stirrer was charged with 0.6 kg of pure water and 0.6 g of methyl cellulose and sufficiently purged with nitrogen. Then, 0.57 kg of 1,1,1,3,3-pentafluorobutane was put therein and the temperature inside the system was maintained at 37° C. A gas mixture of TFE/VdF=18/82 (ratio by mole) was put into the autoclave, so that the pressure inside the container was adjusted to 1.5 MPa. Then, 0.56 g of 4-pentenoic acid and 2.2 g of a 50 mass % methanol solution of di-n-propyl peroxydicarbonate were added, whereby the polymerization was initiated. A gas mixture of TFE/VdF=33/67 (ratio by mole) was added so as to maintain the pressure inside the container, and 70 g in total of the gas mixture was fed before the completion of the reaction. In response to the feeding of gas mixture, 4-pentenoic acid was continuously added, and 0.65 g in total thereof was added before the completion of the reaction. Completion of feeding 70 g of the gas mixture was followed by release of the gas inside the container, whereby the reaction was completed.

The reaction product was washed with water and dried, whereby 66 g of a fluorine-containing polymer G was obtained.

The composition and physical properties of the resulting fluorine-containing polymer G are shown in Table 1.

Polymerization Example 8 (Production of Fluorine-Containing Polymer H)

A 2-L autoclave provided with a stirrer was charged with 0.6 kg of pure water and 0.6 g of methyl cellulose and sufficiently purged with nitrogen. Then, 0.57 kg of 1,1,1,3,3-pentafluorobutane was put therein and the temperature inside the system was maintained at 37° C. A gas mixture of TFE/VdF=17/83 (ratio by mole) was put into the autoclave, so that the pressure inside the container was adjusted to 1.5 MPa. Then, 0.74 g of 4-pentenoic acid and 1.0 g of a 50 mass % methanol solution of di-n-propyl peroxydicarbonate were added, whereby the polymerization was initiated. A gas mixture of TFE/VdF=32/68 (ratio by mole) was added so as to maintain the pressure inside the container, and 70 g in total of the gas mixture was fed before the completion of the reaction. In response to the feeding of gas mixture, 4-pentenoic acid was continuously added, and 0.84 g in total thereof was added before the completion of the reaction. Completion of feeding 70 g of the gas mixture was followed by release of the gas inside the container, whereby the reaction was completed.

The reaction product was washed with water and dried, whereby 66 g of a fluorine-containing polymer H was obtained.

The composition and physical properties of the resulting fluorine-containing polymer H are shown in Table 1.

Polymerization Example 9 (Production of Fluorine-Containing Polymer X)

A 3-L autoclave provided with a stirrer was charged with 1480 g of pure water such that the concentration of an emulsifier $F(CF_2)_5COONH_4$ became 1.0 mass %, and sufficiently purged with nitrogen. Then, the temperature inside the system was maintained at 70° C. A gas mixture of tetrafluoroethylene/vinylidene fluoride=35/65 (ratio by mole) was put into the autoclave, so that the pressure inside the container was adjusted to 0.8 MPa. Then, 0.5 g of isopropyl alcohol and 0.15 g of ammonium persulfate were added, whereby the polymerization was initiated. A gas mixture of tetrafluoroethylene/vinylidene fluoride=33/67 (ratio by mole) was added so as to maintain the pressure inside the container, and 420 g in total of the gas mixture was fed before the completion of the reaction. From the initiation of the reaction to the completion of the reaction, 0.15 g in total of ammonium persulfate was added. Completion of feeding 420 g of the gas mixture was followed by release of the gas inside the container, whereby the reaction was completed.

The inside of the container was cooled down, whereby an aqueous dispersion of a polymer with a solid concentration of 20.2 mass % was obtained. To the resulting dispersion was added 8 g of a 28 mass % aqueous solution of aluminum sulfate, and the slurry was filtered. The slurry collected was washed with 2 L of pure water and dried, whereby 401 g of a fluorine-containing polymer X was obtained.

The composition and physical properties of the resulting fluorine-containing polymer X are shown in Table 1.

Polymerization Example 10 (Production of Fluorine-Containing Polymer Y)

In accordance with the examples of JP 2001-19896 A, a fluorine-containing polymer Y was synthesized.

The composition and physical properties of the resulting fluorine-containing polymer Y are shown in Table 1.

Polymerization Example 11 (Fluorine-Containing Polymer Z)

Homo-PVdF for a battery binder was used. The composition and physical properties are shown in Table 1.

Examples 1 to 8 and Comparative Examples 1 to 3

With the fluorine-containing polymers shown in Table 1, the physical properties were determined and evaluated by the following methods. The results are shown in Table 1.
(Polymer Composition 1)

The ratio between VdF and TFE was determined by $^{19}$F-NMR measurement using a NMR analyzer (VNS400 MHz, Agilent Technologies Inc.) and the polymer in the state of a DMF-$d_7$ solution.

The following peak areas (A, B, C, and D) were measured by $^{19}$F-NMR measurement, and the proportions of VdF and TFE were calculated.

A: peak area from −86 ppm to −98 ppm
B: peak area from −105 ppm to −118 ppm
C: peak area from −119 ppm to −122 ppm
D: peak area from −122 ppm to −126 ppm $$\text{Proportion of } VdF: X_{VDF}=(4A+2B)/(4A+3B+2C+2D)\times 100 \text{ (mol \%)}$$

$$\text{Proportion of } TFE: X_{TFE}=(B+2C+2D)/(4A+3B+2C+2D)\times 100 \text{ (mol \%)}$$

The amount of 3-butenoic acid or 4-pentenoic acid was measured by acid-base titration of carboxy groups. The procedure is described in detail below.

About 0.5 g of the fluorine-containing polymer was dissolved in 15 g of acetone at 70° C. to 80° C. Then, 5 ml of water was added thereto such that the polymer did not coagulate. Titration with 0.1 N aqueous NaOH was performed until the acidity was completely neutralized, with neutrality transition at about −270 mV. In accordance with the measurement results, the amount of substance α (mol/g) of 3-butenoic acid or 4-pentenoic acid contained in 1 g of the fluorine-containing polymer was calculated. Based on the amount of substance α, the VdF/TFE composition of the fluorine-containing polymer calculated by the aforementioned method, and the molecular weights of TFE, VdF, and 3-butenoic acid or 4-pentenoic acid, the proportion Y (mol %) of 3-butenoic acid or 4-pentenoic acid of the fluorine-containing polymer was determined such that the following formula is satisfied.

$$\alpha=Y/[\{\text{molecular weight of } TFE\}\times\{X_{TFE}\times(100-Y)/100\}+\{\text{molecular weight of } VdF\}\times\{X_{VdF}\times(100-Y)/100\}+\{\text{molecular weight of 3-butenoic acid or 4-pentenoic acid}\}\times Y]$$

Based on the resulting values $X_{VdF}$, $X_{TFE}$, and Y, the final compositional proportions were calculated as follows.

Proportion of VdF: $X_{VDF} \times (100-Y)/100$ (mol %)

Proportion of TFE: $X_{TFE} \times (100-Y)/100$ (mol %)

Proportion of 3-butenoic acid or 4-pentenoic acid: Y (mol %)

(Polymer Composition 2)

For the ratio between VdF and monomethyl maleate of the fluorine-containing polymer Y, the amount β (mol/g) of carbonyl groups was calculated in accordance with the method disclosed in JP 2001-19896 A and was used in the following formula, so that the polymer composition was determined.

Proportion of VdF: {1−(molecular weight of monomethyl maleate)×β}/[1−{(molecular weight of monomethyl maleate)−(molecular weight of VdF)}×β]×100 (mol %)

Proportion of monomethyl maleate: (molecular weight of VdF)×β/[1−{(molecular weight of monomethyl maleate)−(molecular weight of VdF)}×β]×100 (mol %)

(Weight Average Molecular Weight)

The weight average molecular weight was determined by gel permeation chromatography (GPC). The weight average molecular weight was calculated from the data (reference: polystyrene) measured by flowing dimethyl formamide (DMF) serving as a solvent at a rate of 1.0 ml/min using AS-8010, CO-8020, and columns (three GMHHR-H columns connected in series) (each available from Tosoh Corp.), and RID-10A (Shimadzu Corp.).

(Solution Viscosity)

A 5 mass % N-methyl-2-pyrrolidone (NMP) solution of the fluorine-containing polymer was prepared, and the viscosity was measured at 25° C. using a B-type viscometer TV-10M (Toki Sangyo Co., Ltd.).

(Preparation of Binder Solution)

The binder (fluorine-containing polymer) was weighed and dissolved in N-methyl-2-pyrrolidone (NMP) such that the concentration was 5 mass %, whereby a binder solution was prepared.

(Formation of Film and Evaluation of Elongation at Break)

The binder solution obtained was cast on a glass plate and dried at 100° C. for two hours, whereby a film having a thickness of about 30 μm was obtained.

The resulting films were each punched to have a dumbbell shape in conformity with ASTM D1708, and the elongation at break was measured at 25° C. using an autograph.

(Formation of Film and Evaluation of Storage Elastic Modulus)

The binder (fluorine-containing polymer) was weighed and dissolved in N-methyl-2-pyrrolidone (NMP) such that the concentration was 8 mass %, whereby a binder solution was prepared. The binder solution was cast on a glass plate and dried at 100° C. for 12 hours, followed by 100° C. for 12 hours in vacuo, whereby a film having a thickness of about 40 μm was obtained. The resulting films were each cut into a piece having a size of 30 mm in length and 5 mm in width, and this piece was used as a sample. For the sample having a size of 30 mm in length, 5 mm in width, and 40 μm in thickness, the storage elastic modulus at 25° C. and at 100° C. was determined in a tensile mode, at a grip width of 20 mm, a measurement temperature of −30° C. to 160° C., a temperature-increasing rate of 2° C./rain, and a frequency of 1 Hz, using a dynamic viscoelasticity analyzer DVA220 (IT Keisoku Seigyo K.K.).

With the fluorine-containing polymers of the examples and comparative examples, positive electrodes were produced as follows and the physical properties were determined and evaluated. The results are shown in Table 1.

(Preparation of Slurry for Positive Electrode Mixture)

A positive electrode active material (NMC (532) ($LiNi_{0.5}Mn_{0.3}Co_{0.2}O_2$)), acetylene black (AB) serving as a conductive agent, and the binder (fluorine-containing polymer) were weighed in a mass ratio shown in Table 1. The fluorine-containing polymer was dissolved in N-methyl-2-pyrrolidone (NMP) such that the concentration was 8 mass %. This NMP solution of the binder was sufficiently mixed with the predetermined amounts of the positive electrode active material and the conductive agent using a stirring device, ensuring good uniformity.

The solids concentration of the slurry was adjusted to 70%.

(Production of Positive Electrode)

The resulting slurry for a positive electrode mixture was uniformly applied to an electrode current collector plate formed of aluminum foil having a thickness of 20 μm and NMP was completely evaporated, whereby a positive electrode was produced.

(Measurement of Density of Positive Electrode)

The resulting electrode was rolled using a roller press until the density of the positive electrode mixture film reached a predetermined density. The density was calculated from the area, thickness, and weight measured.

(Evaluation of Electrode Flexibility (Folding Test on Positive Electrode))

The resulting positive electrode was cut into a size of 3 cm in length and 6 cm in width, and the sample was folded 180° and unfolded. The positive electrode was visually checked for damage and cracking. The positive electrodes with no damage or cracking were evaluated as good, the positive electrodes with cracking were evaluated as acceptable, and the positive electrodes broken were evaluated as poor.

This evaluation was performed on the positive electrodes with the electrode densities shown in Table 1.

(Evaluation of Electrode Adhesiveness (Peeling Test on Positive Electrode))

The positive electrode was cut into a size of 1.2 cm in length and 8.0 cm in width, and the electrode side surface of this piece was fixed to a movable jig with double-sided tape. The current collector was pulled 90 degrees at a rate of 100 ram/min, and the stress (N/mm) was determined using an autograph.

(Gelling Resistance of Positive Electrode Mixture Slurry)

With a Ni-rich positive electrode active material NCA ($LiNi_{0.82}Co_{0.15}Al_{0.03}O_2$), positive electrode mixture slurry was prepared as follows, and the gelling resistance of this slurry was evaluated. The results are shown in Table 2.

(Preparation of Slurry for Positive Electrode Mixture)

The positive electrode active material NCA ($LiNi_{0.82}Co_{0.15}Al_{0.03}O_2$), acetylene black (AB) serving as a conductive agent, and the binder (fluorine-containing polymer) were weighed in a mass ratio of active material/AB/polymer=93/4/3. The fluorine-containing polymer was dissolved in N-methyl-2-pyrrolidone (NMP) such that the concentration was 8 mass %. This NMP solution of the binder was sufficiently mixed with predetermined amounts of the positive electrode active material and the conductive agent using a stirring device, ensuring good uniformity. The solids concentration of the composition was adjusted to 70%.

(Evaluation of Gelling Resistance)

For the resulting slurry for a positive electrode mixture containing NCA, the viscosity was measured using a B-type viscometer immediately after the production of slurry and 24 hours after the production.

The slurries with a value of the following calculation of 300(%) or higher were evaluated as poor (gelatinized), while the slurries with a value of the following calculation of lower than 300(%) were evaluated as good.

Viscosity of slurry 24 hours after production×100/ Viscosity of slurry immediately after production

TABLE 1

| | | Example 1 | Example 2 | Example 3 | Example 4 | Example 5 |
|---|---|---|---|---|---|---|
| Fluorine-containing polymer | | A | B | C | D | E |
| | Functional group monomer (α) | 3-Butenoic acid | 3-Butenoic acid | 4-Pentenoic acid | 4-Pentenoic acid | 3-Butenoic acid |
| | Polymer composition (mol %) (VdF/TFE/α) | 85.58/14.03/0.39 | 81.01/18.53/0.46 | 86.90/12.75/0.35 | 81.63/17.92/0.45 | 66.83/32.47/0.70 |
| | Weight average molecular weight | 1260000 | 910000 | 830000 | 820000 | 1160000 |
| | Solution viscosity (mPa·s) | 1185 | 609 | 400 | 393 | 1393 |
| | Storage elastic modulus (MPa) (25°C.) | 595 | 487 | 780 | 491 | 471 |
| | Storage elastic modulus (MPa) (100° C.) | 103 | 49 | 128 | 48 | 61 |
| | Elongation at break (%) | 362 | 378 | 341 | 362 | 372 |
| Evaluation with active material NMC (532) | | | | | | |
| Composition of mixture | Composition (ratio by mass) (active material/AB/polymer) | 96/2/2 | 96/2/2 | 96/2/2 | 96/2/2 | 96/2/2 |
| Physical properties of electrode | Electrode flexibility  density 3.4 g/cc | Good | Good | Good | Good | Good |
| | density 3.2 g/cc | Good | Good | Good | Good | Good |
| | Peeling strength (adhesiveness) (N/m) | 0.52 | 0.54 | 0.49 | 0.50 | 0.52 |

| | | Example 6 | Example 7 | Example 8 | Comparative Example 1 | Comparative Example 2 | Comparative Example 3 |
|---|---|---|---|---|---|---|---|
| Fluorine-containing polymer | | F | G | H | X | Y | Z |
| | Functional group monomer (α) | 3-Butenoic acid | 4-Pentenoic acid | 4-Pentenoic acid | None | Monomethyl maleate | None |
| | Polymer composition (mol %) (VdF/TFE/α) | 68.18/30.92/0.90 | 67.03/32.27/0.70 | 68.08/31.02/0.90 | 66.50/33.50/0 | 99.52/0/0.48 | 100/0/0 |
| | Weight average molecular weight | 910000 | 930000 | 1100000 | 980000 | 650000 | 790000 |
| | Solution viscosity (mPa·s) | 792 | 810 | 1170 | 970 | 196 | 393 |
| | Storage elastic modulus (MPa) (25°C.) | 473 | 453 | 460 | 550 | 1420 | 1820 |
| | Storage elastic modulus (MPa) (100° C.) | 58 | 59 | 52 | 84 | 379 | 524 |
| | Elongation at break (%) | 369 | 358 | 360 | 424 | 218 | 12 |
| Evaluation with active material NMC (532) | | | | | | | |
| Composition of mixture | Composition (ratio by mass) (active material/AB/polymer) | 96/2/2 | 96/2/2 | 96/2/2 | 96/2/2 | 96/2/2 | 96/2/2 |
| Physical properties of electrode | Electrode flexibility  density 3.4 g/cc | Good | Good | Good | Acceptable | Poor | Poor |
| | density 3.2 g/cc | Good | Good | Good | Good | Acceptable | Poor |
| | Peeling strength (adhesiveness) (N/m) | 0.54 | 0.51 | 0.55 | 0.11 | 021 | 0.18 |

TABLE 2

| | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|
| Evaluation of gelling resistance | Good | Good | Good | Good | Good | Good | Good | Good | Good | Poor | Poor |

The invention claimed is:

1. A binder for a secondary battery, comprising a fluorine-containing polymer containing:
a polymerized unit based on vinylidene fluoride;
a polymerized unit based on tetrafluoroethylene; and
a polymerized unit based on a monomer (2-2) represented by the following formula (2-2):

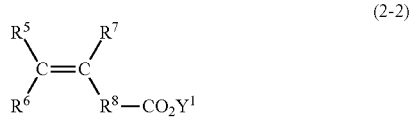

(2-2)

wherein $R^5$, $R^6$, and $R^7$ are each independently a hydrogen atom or a C1-C8 hydrocarbon group; $R^8$ is a C1-C8 hydrocarbon group; and $Y^1$ is at least one cation selected from the group consisting of H, Mg, Ca, Al, and $NH_4$.

2. The binder for a secondary battery according to claim 1,
wherein the fluorine-containing polymer contains the polymerized unit based on vinylidene fluoride in an amount of 50 to 95 mol %, the polymerized unit based on tetrafluoroethylene in an amount of 4.8 to 49.95 mol %, and the polymerized unit based on the monomer (2-2) in an amount of 0.05 to 2.0 mol %, of all the polymerized units.

3. The binder for a secondary battery according to claim 1,
wherein the fluorine-containing polymer has a weight average molecular weight of 50000 to 2000000.

4. The binder for a secondary battery according to claim 1,
wherein the fluorine-containing polymer has a storage elastic modulus of 1000 MPa or lower at 25° C.

5. The binder for a secondary battery according to claim 1,
wherein the fluorine-containing polymer has a storage elastic modulus of 800 MPa or lower at 25° C.

6. An electrode mixture for a secondary battery, comprising a mixture containing at least:
the binder for a secondary battery according to claim 1;
a powdery electrode material for a battery; and
water or a nonaqueous solvent.

7. An electrode for a secondary battery, comprising the binder for a secondary battery according to claim 1.

8. A secondary battery comprising the electrode for a secondary battery according to claim 7.

9. The binder for a secondary battery according to claim 1,
wherein the monomer (2-2) comprises 3-butenoic acid, 3-pentenoic acid, 4-pentenoic acid, 3-hexenoic acid, 4-hexenoic acid, 5-hexenoic acid, or salts thereof.

10. The binder for a secondary battery according to claim 1,
wherein the monomer (2-2) comprises 3-butenoic acid, 4-pentenoic acid, or salts thereof.

* * * * *